United States Patent
Masuda

(10) Patent No.: US 10,511,788 B2
(45) Date of Patent: *Dec. 17, 2019

(54) VIDEO SWITCHING APPARATUS, VIDEO SWITCHING METHOD, PROGRAM, AND INFORMATION PROCESSING APPARATUS

(71) Applicant: SONY CORPORATION, Tokyo (JP)

(72) Inventor: Yasuto Masuda, Kanagawa (JP)

(73) Assignee: SONY CORPORATION, Tokyo (JP)

(\*) Notice: Subject to any disclaimer, the term of this patent is extended or adjusted under 35 U.S.C. 154(b) by 12 days.

This patent is subject to a terminal disclaimer.

(21) Appl. No.: 15/397,477

(22) Filed: Jan. 3, 2017

(65) Prior Publication Data

US 2017/0118417 A1    Apr. 27, 2017

Related U.S. Application Data

(63) Continuation of application No. 14/768,249, filed as application No. PCT/JP2014/058161 on Mar. 25, 2014, now Pat. No. 9,554,062.

(30) Foreign Application Priority Data

Apr. 4, 2013   (JP) ................................ 2013-078697

(51) Int. Cl.
*H04N 5/268*   (2006.01)
*H04N 21/2343* (2011.01)
(Continued)

(52) U.S. Cl.
CPC ............ *H04N 5/268* (2013.01); *H04H 20/10* (2013.01); *H04H 20/42* (2013.01); *H04H 60/04* (2013.01);
(Continued)

(58) Field of Classification Search
CPC ......... H04N 21/23439; H04N 21/2662; H04N 5/268
(Continued)

(56) References Cited

U.S. PATENT DOCUMENTS 9,554,062 B2 \* 1/2017 Masuda ........... H04N 21/23439
2002/0013948 A1   1/2002 Aguayo, Jr.
(Continued)

FOREIGN PATENT DOCUMENTS

JP    2005-86222 A    3/2005
JP    2008-271294 A    11/2008
(Continued)

OTHER PUBLICATIONS

International Search Report dated May 27, 2014 in PCT/JP2014/058161 (with English language translation).
(Continued)

*Primary Examiner* — Jefferey F Harold
*Assistant Examiner* — Jean W Desir
(74) *Attorney, Agent, or Firm* — Oblon, McClelland, Maier & Neustadt, L.L.P.

(57) ABSTRACT

A video switcher includes: a reception unit which receives video data within a range of a prescribed bandwidth via a network from video output apparatuses; a transmission unit which selects one or more pieces from among received video data, and transmits the selected one or more pieces to a video processing apparatus; a selection unit which dynamically sets a priority degree of each piece of video data, and selects video data to be received: and a control unit which controls a transmission and reception of video data. When a bandwidth necessary for a reception of new video data is insufficient, the selection unit selects video data for which reception is to be stopped from among video data being received based on the priority degree, and the control unit performs a control so as to stop a reception of selected video data and start a reception of the new video data.

9 Claims, 18 Drawing Sheets

(51) Int. Cl.

| | |
|---|---|
| *H04N 21/2662* | (2011.01) |
| *H04N 21/2187* | (2011.01) |
| *H04N 21/239* | (2011.01) |
| *H04N 21/24* | (2011.01) |
| *H04N 21/2665* | (2011.01) |
| *H04H 20/42* | (2008.01) |
| *H04H 20/10* | (2008.01) |
| *H04H 60/04* | (2008.01) |
| *H04N 5/38* | (2006.01) |
| *H04N 5/44* | (2011.01) |
| *H04N 5/247* | (2006.01) |

(52) U.S. Cl.
CPC ............. *H04N 5/38* (2013.01); *H04N 5/44* (2013.01); *H04N 21/2187* (2013.01); *H04N 21/2393* (2013.01); *H04N 21/23439* (2013.01); *H04N 21/24* (2013.01); *H04N 21/2402* (2013.01); *H04N 21/2662* (2013.01); *H04N 21/2665* (2013.01); *H04N 5/247* (2013.01)

(58) Field of Classification Search
USPC ...... 348/705, 706, 384.1, 388.1; 725/95, 90; 375/240
See application file for complete search history.

(56) References Cited

U.S. PATENT DOCUMENTS

| | | | |
|---|---|---|---|
| 2008/0104202 A1* | 5/2008 | Barrett | .................. H04N 7/163 |
| | | | 709/219 |
| 2010/0083297 A1 | 4/2010 | Yamamoto et al. | |
| 2010/0131690 A1 | 5/2010 | Homma et al. | |
| 2013/0339451 A1 | 12/2013 | Nyberg et al. | |

FOREIGN PATENT DOCUMENTS

| | | |
|---|---|---|
| JP | 2009-17064 A | 1/2009 |
| JP | 2010-130352 A | 6/2010 |
| JP | 2010-192027 A | 9/2010 |
| JP | 2012-256971 A | 12/2012 |
| WO | WO 2012/120339 A1 | 9/2012 |

OTHER PUBLICATIONS

Extended European Search Report dated Dec. 15, 2016 in Patent Application No. 14778947.3.

* cited by examiner

FIG.6

| VIDEO ID | TRANSMISSION STOP TIME | RECEIVING FLAG | TRANSMITTING FLAG | USAGE BAND |
|---|---|---|---|---|
| 1 | 00:00:00 | ○ | ○ | 1.5Gbps |
| 2 | 00:14:43 | ○ |  | 0.4Gbps |
| 3 | 00:05:01 | ○ |  | 0.1Gbps |
| 4 | 00:17:38 | ○ |  | 0.1Gbps |
| 5 | 00:08:22 | ○ |  | 0.2Gbps |
| 6 | 00:30:00 |  |  | 1.5Gbps |
| 7 | 00:04:33 | ○ |  | 1.0Gbps |
| 8 | 00:02:15 | ○ |  | 1.5Gbps |

FIG.9

| VIDEO ID | TRANSMITTING FLAG | RECEIVING FLAG | RECEPTION REQUEST FLAG | TRANSMISSION STOP TIME | RECEIVING VIDEO BAND (Gbps) | REQUEST BAND (Gbps) | RECEPTION CONTINUATION PRIORITY ORDER |
|---|---|---|---|---|---|---|---|
| 1 | ○ | ○ | | 00:00:00 | 1.5 | | 1 |
| 8 | | ○ | | 00:02:15 | 1.5 | | 2 |
| 7 | | ○ | | 00:04:33 | 1.0 | | 3 |
| 3 | | ○ | | 00:05:01 | 0.1 | | 4 |
| 5 | | ○ | | 00:08:22 | 0.2 | | 5 |
| 2 | | ○ | | 00:14:43 | 0.4 | | 6 |
| 4 | | ○ | | 00:17:38 | 0.1 | | 7 |
| 6 | | | ○ | 00:30:00 | | 1.5 | |

FIG. 10

| VIDEO ID | RECEPTION CONTINUATION PRIORITY ORDER | CUTTING CANDIDATE BAND TOTAL (Gbps) | SURPLUS BAND (Gbps) | NECESSARY BAND REACHING FLAG | BOUNDARY DETECTION (Gbps) | CUTTING CANDIDATE |
|---|---|---|---|---|---|---|
| 1 | 1 | 4.8 | 3.5 | ○ | 4.8 | NOT TARGET |
| 8 | 2 | 3.3 | 2.0 | ○ | 3.3 | NOT TARGET |
| 7 | 3 | 1.8 | 0.5 | ○ | 1.8 | TARGET |
| 3 | 4 | 0.8 | -0.5 | × | | TARGET |
| 5 | 5 | 0.7 | -0.6 | × | | TARGET |
| 2 | 6 | 0.5 | -0.8 | × | | TARGET |
| 4 | 7 | 0.1 | -1.2 | × | | TARGET |

FIG. 12

| VIDEO ID | CUTTING CANDIDATE EXCLUSION PRIORITY ORDER | SURPLUS BAND (Gbps) | CUTTING CANDIDATE EXCLUSION PROPRIETY | CUTTING CANDIDATE EXCLUSION BAND TOTAL (Gbps) | CUTTING TARGET BAND TOTAL (Gbps) | FINAL DECISION |
|---|---|---|---|---|---|---|
| 1 | | | | | | |
| 8 | | | | | | |
| 7 | 1 | -0.5 | NOT POSSIBLE | 0.0 | 1.0 | CUT |
| 3 | 2 | 0.4 | POSSIBLE | 0.1 | 1.0 | RECEPTION CONTINUING |
| 5 | 3 | 0.2 | POSSIBLE | 0.3 | 1.0 | RECEPTION CONTINUING |
| 2 | 4 | -0.2 | NOT POSSIBLE | 0.3 | 1.4 | CUT |
| 4 | 5 | 0.1 | POSSIBLE | 0.4 | 1.4 | RECEPTION CONTINUING |
| 6 | | | | | | |

FIG. 14

| VIDEO ID | TRANSMISSION STOP TIME | RECEIVING FLAG | TRANSMITTING FLAG | USAGE BAND |
|---|---|---|---|---|
| 1 | 00:00:10 | ○ |  | 1.5Gbps |
| 2 | 00:14:53 |  |  | 0.4Gbps |
| 3 | 00:05:11 | ○ |  | 0.1Gbps |
| 4 | 00:17:48 | ○ |  | 0.1Gbps |
| 5 | 00:08:32 | ○ |  | 0.2Gbps |
| 6 | 00:00:00 | ○ | ○ | 1 5Gbps |
| 7 | 00:04:43 |  |  | 1.0Gbps |
| 8 | 00:02:25 | ○ |  | 1.5Gbps | ized beforehand, and are not
VIDEO SWITCHING APPARATUS, VIDEO SWITCHING METHOD, PROGRAM, AND INFORMATION PROCESSING APPARATUS

CROSS REFERENCE TO RELATED APPLICATIONS

This application is a continuation of U.S. application Ser. No. 14/768,249, filed on Aug. 17, 2015 (the entire contents being incorporated herein by reference), and is based upon and claims the benefit of priority to International Application No. PCT/JP2014/058161, filed on Mar. 25, 2014 and from the prior Japanese Patent Application No. 2013-078697, filed on Apr. 4, 2013.

TECHNICAL FIELD

The present disclosure relates to a video switching apparatus, a video switching method, a program and an information processing apparatus, and specifically relates to a video switching apparatus, a video switching method, a program and an information processing apparatus to be suitably used in the case where receiving a plurality of video data via a network, and switching video data to be transmitted in a later stage from among the received plurality of video data.

BACKGROUND ART

In the case where transferring video data for broadcast in a broadcasting station or the like by using a best-effort-type communication network, a loss of data or a change of image quality will not be permitted, and so a method will not able to be adopted which dynamically changes an encoding rate of the video data, in accordance with traffic of the network. Therefore, it may be necessary to control a transfer amount of the video data, so that a usage band of the video data to be transferred does not exceed the bandwidth of the network.

As an example of this countermeasure, in the case where a LAN bandwidth to which a plurality of clients are connected is insufficient, it has been proposed to perform arbitration between the clients by an arbitration condition set in advance based on a priority order of the clients, priority degrees of the contents, usage bands of the contents and usage times of the contents, and to select a content to be received (for example, refer to Patent Literature 1).

CITATION LIST

Patent Literature

Patent Literature 1: JP 2010-130352A

SUMMARY OF INVENTION

Technical Problem

However, in the disclosure of Patent Literature 1, parameters such as the priority degree of contents to be used for arbitration are statically registered beforehand, and are not able to correspond, for example, to the case where the priority degree of video data dynamically changes.

Accordingly, the present disclosure can transfer video data more efficiently, while preventing a loss of data or a deterioration of image quality, within a range of a usable bandwidth of a network.

Solution to Problem

A video switching apparatus according to a first aspect of the present technology includes: a reception unit which receives video data within a range of a prescribed bandwidth via a network from a plurality of first apparatuses; a transmission unit which selects one or more pieces from among received video data, and transmits the selected one or more pieces to a second apparatus which sends video data; a selection unit which dynamically sets a priority degree of each piece of video data, and selects video data to be received from the plurality of first apparatuses based on the priority degree: and a transmission and reception control unit which controls a transmission and reception of video data. In a case where a bandwidth necessary for a reception of new video data is insufficient, the selection unit selects video data for which reception is to be stopped from among video data being received based on the priority degree. The transmission and reception control unit performs a control in a manner that a reception of selected video data is stopped and a reception of the new video data is started.

The selection unit may set the priority degree of each piece of video data based on an elapsed time from when stopping a transmission to the second apparatus.

The selection unit may set a highest priority degree of video data being transmitted to the second apparatus.

The selection unit may select, up until a total of usage bands of candidates of video data for which reception is to be stopped and a presently empty band becomes a usage band of the new video data or higher, the candidates in an order of the lowest priority degree from among video data being received, and afterwards select video data to be excluded from the candidates in a range where a total of usage bands of the candidates and a presently empty band does not become a usage band of the new video data or lower. The transmission and reception control unit may perform a control in a manner that a reception of video data finally remaining in the candidates is stopped.

The selection unit may select, up until a total of candidates of video data for which reception is to be stopped and a presently empty band becomes a usage band of the new video data or higher, the candidates in an order of the lowest priority degree from among video data being received. A user interface unit which performs a control in a manner that the selected candidates are presented along with the priority degrees, and accepts a selection for the presented candidates may be further provided. The transmission and reception control unit may perform a control in a manner that a reception of video data selected from among the candidates is stopped.

A video switching method according to the first aspect of the present technology, by a video switching apparatus which receives video data within a range of a prescribed bandwidth via a network from a plurality of first apparatuses, selects one or more pieces from among received video data, and transmits the selected one or more pieces to a second apparatus which sends video data, includes the steps of: dynamically setting a priority degree of each piece of video data selecting, in a case where a bandwidth necessary for a reception of new video data is insufficient, video data for which reception is to be stopped from among video data being received based on the priority degree; and performing a control in a manner that a reception of selected video data is stopped and a reception of the new video data is started.

A program according to the first aspect of the present technology causes a computer of a video switching apparatus which receives video data within a range of a prescribed bandwidth via a network from a plurality of first apparatuses, selects one or more pieces from among received video data, and transmits the selected one or more pieces to a second apparatus which sends video data, to perform a process including the steps of: dynamically setting a priority degree of each piece of video data selecting, in a case where a bandwidth necessary for a reception of new video data is insufficient, video data for which reception is to be stopped from among video data being received based on the priority degree; and performing a control in a manner that a reception of selected video data is stopped and a reception of the new video data is started.

An information processing apparatus according to a second aspect of the present technology includes: a selection unit which dynamically sets a priority degree of each piece of video data being received by a video switching apparatus which receives video data within a range of a prescribed bandwidth via a network from a plurality of first apparatuses, selects one or more pieces from among received video data, and transmits the selected one or more pieces to a second apparatus which sends video data, and in a case where a bandwidth necessary for a reception of new video data is insufficient, selects video data for which reception is to be stopped from among video data being received by the video switching apparatus based on the priority degree; and a communication unit which notifies selected video data to the video switching apparatus.

In the first aspect of the present disclosure, a priority degree of each piece of video data is set, and in the case where a bandwidth necessary for a reception of new video data is insufficient, video data for which reception is to be stopped is selected from among video data being received, based on the priority degree, a reception of the selected video data is stopped, and a reception of the new video data is started.

In the second aspect of the present disclosure, a priority degree of each piece of video data being received by a video switching apparatus, which receives video data within a range of a prescribed bandwidth via a network from a plurality of first apparatuses, selects one or more pieces from among the received video data, and transmits the selected one or more pieces to a second apparatus which sends video data, is set, and in the case where a bandwidth necessary for a reception of new video data is insufficient, video data for which reception is to be stopped is selected from among video data being received by the video switching apparatus, based on the priority degree, and the selected video data is notified to the video switching apparatus.

Advantageous Effects of Invention

According to the first aspect or the second aspect of the present disclosure, video data can be transferred more efficiently, while preventing a loss of data or a deterioration of image quality, within a range of a usable bandwidth of a network.

BRIEF DESCRIPTION OF DRAWINGS

FIG. 6 is a figure which shows an example of a priority degree table prior to a switching of video data.

FIG. 9 is a figure for describing a specific example of a setting method of a reception continuation priority order.

FIG. 10 is a figure for describing a specific example of a selection method of cutting candidates.

FIG. 12 is a figure for describing a specific example of a cutting target determination process.

FIG. 14 is a figure which shows an example of a priority degree table after a switching of video data.

DESCRIPTION OF EMBODIMENTS

Hereinafter, the modes for executing the present disclosure (hereinafter called the embodiments) will be described. Note that, the description will be given in the following order.

1. Embodiment
2. Modified examples

1. Embodiment

[Configuration Example of the Video Processing System]

Figure 1:
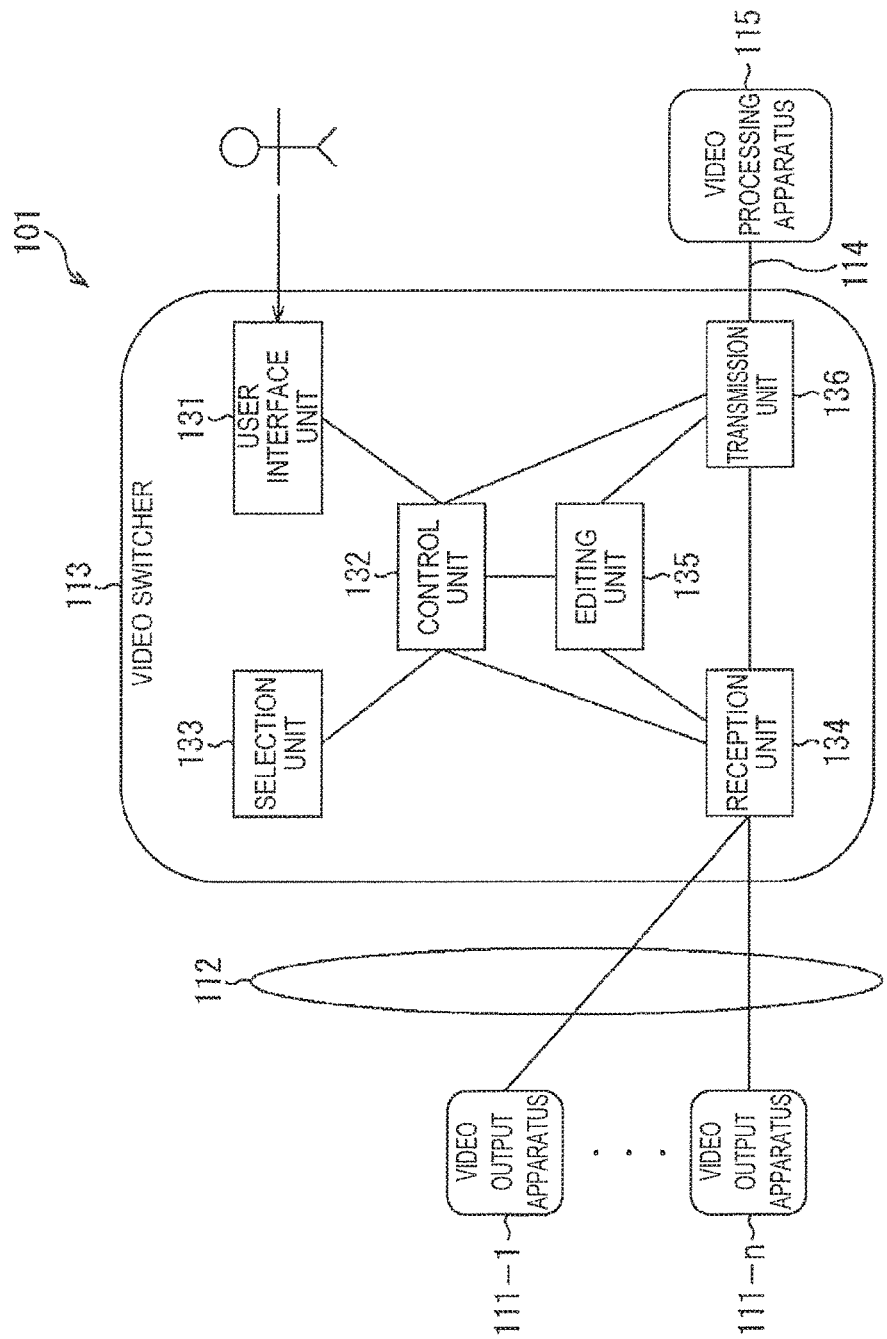
FIG. 1 is a block diagram which shows an embodiment of a video processing system applicable to the present disclosure.

FIG. 1 shows an embodiment of a video processing system applicable to the present disclosure.

The video processing system 101 is a system, for example, included in a broadcasting station or the like, which performs various types of processes of video data, for example, the generation, editing, transferring, sending, recording or the like of video data.

Here, not only a video, but various types of data which accompany a video, for example, audio data, metadata or the like, is included in the video data.

The video processing system 101 is constituted by including video output apparatuses 111-1 through to 111-n, a network 112, a video switcher 113, a cable 114, and a video processing apparatus 115. The video output apparatuses 111-1 through to 111-n and the video switcher 113 are mutually connected via the network 112. The video switcher 113 and the video processing apparatus 115 are mutually connected via the cable 114.

The video output apparatuses 111-1 through to 111-n are constituted, for example, by various types of apparatuses which perform an output of video data such as a camera or an archive system. Further, the video output apparatuses 111-1 through to 111-n have, for example, a communication function based on an Internet portal (IP), and transmit video data to the video switcher 113 via the network 112.

Note that, at least two or more of the video output apparatuses 111-1 through to 111-n are included, and it may not be necessary for all of them to be a same type of apparatus.

The network 112 is constituted, for example, by an IP network capable of communicating based on an IP.

The video switcher 113 is an apparatus which performs switching of video data to be received from the video output apparatuses 111-1 through to 111-n, switching of video data to be transmitted to the video processing apparatus 115, editing of the received video data or the like. The video switcher 113 is constituted by including the functions of a user interface unit 131, a control unit 132, a selection unit 133, a reception unit 134, an editing unit 135, and a transmission unit 136.

The user interface unit 131 is constituted, for example, by various types of input devices, display devices or the like, and accepts an input such as an instruction from a user or data, and controls a display such as an operation screen or the state of the video switcher 113. The user interface unit 131 supplies the input instruction, data or the like to the control unit 132. Note that, for example, it is possible for the user interface unit 131 to separately include a display device, or for the user interface unit 113 to control a display of an external display device.

The control unit 132 controls the operations of each unit of the video switcher 113. Further, the control unit 132 controls a reception of video data from the video output apparatuses 111-1 through to 111-n, and a transmission of video data to the video processing apparatus 115.

The selection unit 133 dynamically sets a priority degree of each piece of video data from the video output apparatuses 111-1 through to 111-n, and updates a priority degree table which shows the set priority degrees. Further, the selection unit 133 selects video data to be received from the video output apparatuses 111-1 through to 111-n, based on the set priority degrees, a usage band of each piece of video data, a bandwidth of the network 112 capable of being used by the video switcher 113 (hereinafter, called a maximum usable band) or the like. Also, the selection unit 133 notifies a selection result of video data to be received to the control unit 132.

Note that, the details of the priority degree table will be described below by referring to FIG. 5.

The reception unit 134 selects video data to be received from the video output apparatus 111-1 through to 111-n, within a range of the maximum usable band of the network 112, under the control of the control unit 132, and receives the selected video data. The reception unit 134 supplies the received video data to the editing unit 135 and the transmission unit 136 as necessary.

Note that, hereinafter, the reception unit 134 starting a reception of video data will be called connecting video data. Further, hereinafter, the reception unit 134 stopping a reception of video data will be called cutting video data.

The editing unit 135 performs editing of video data, under the control of the control unit 132. For example, the editing unit 135 generates new video data, by applying various types of effects to (a video based on) the video data, and combining (a video based on) a plurality of the video data. The editing unit 135 supplies the video data after being edited to the transmission unit 136.

The transmission unit 136 selects video data to be transmitted to the video processing apparatus 115, from among the video data supplied from the reception unit 134 or the editing unit 135, under the control of the control unit 132, and transmits the selected video data to the video processing apparatus 115 via the cable 114.

Note that, for example, a communication system such as a Serial Digital Interface (SDI) is adopted for communication between the transmission unit 136 and the video processing apparatus 115.

The video processing apparatus 115 is constituted by various types of apparatuses which perform processes of video data. For example, the video processing apparatus 115 is constituted by a sending system which sends video data, an archive system which accumulates video data or the like.

Note that, it is possible for the video processing apparatus 115 to not include a plurality of apparatuses, or to be constituted by a system constituting a plurality of apparatuses.

Further, in the present disclosure, the sending of video data is said to be transmitting or outputting video data mainly with the intention of being broadcast.

[Specific Example of the Video Processing System]

Figure 2:
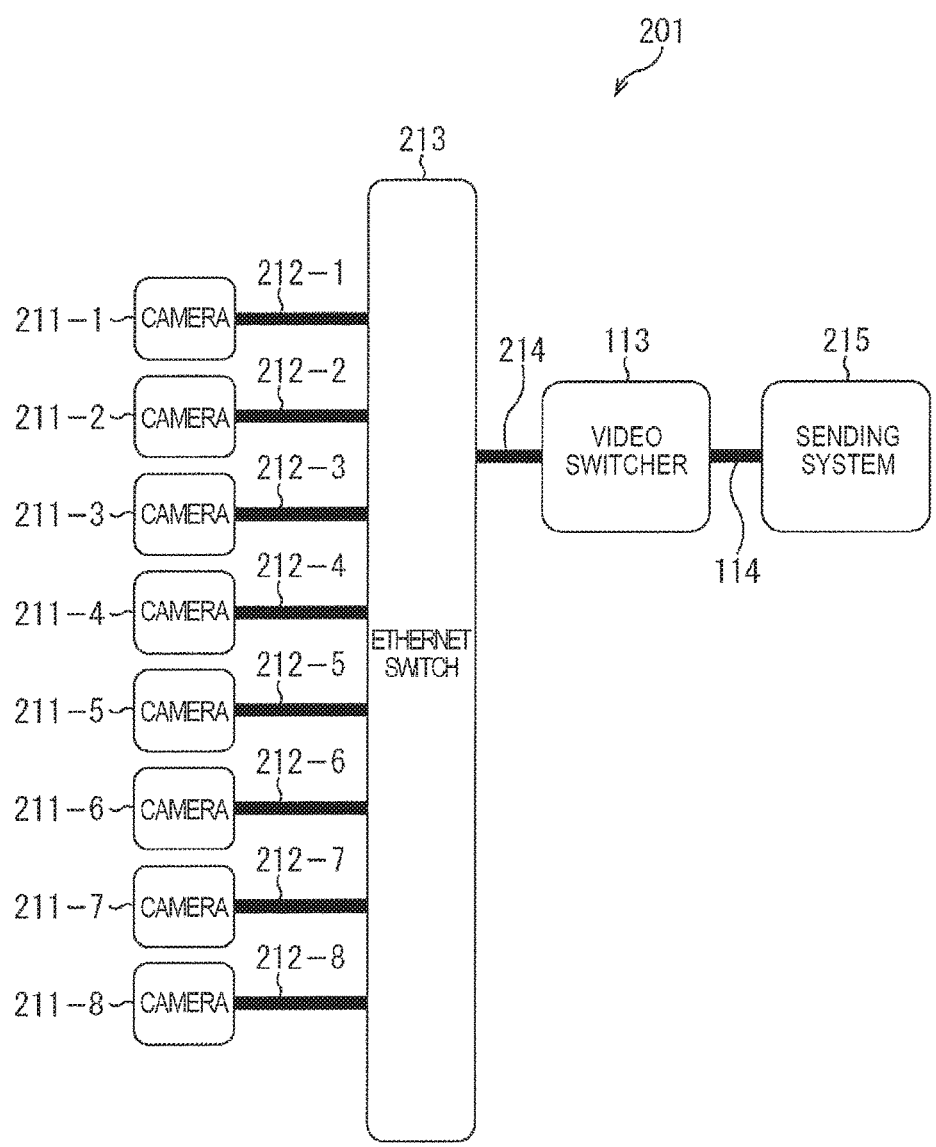
FIG. 2 is a block diagram which shows a specific configuration example of the video processing system.

FIG. 2 shows a configuration example of a video processing system 201 which has been made more specific than the video processing system 101 of FIG. 1. Note that, within the figure, the same reference numerals are attached to portions corresponding to those of FIG. 1, and a description for these portions in which the processes are the same will be omitted as they are repeated.

The video processing system 201 is constituted by including cameras 211-1 through to 211-8, cables 212-1 through to 212-8, an Ethernet switch 213 (Ethernet is a registered trademark), a cable 214, a video switcher 113, a cable 114, and a sending system 215.

The cameras 211-1 through to 211-8 are individually connected to the Ethernet switch 213, via the cables 212-1 through to 212-8. Further, the Ethernet switch 213 is connected to the video switcher 113 via the cable 214. That is, in this example, the network 112 of FIG. 1 is constituted so as to include the cables 212-1 through to 212-8, the Ethernet switch 213, and the cable 214. Further, the video switcher 113 is connected to the sending system 215, via the cable 114.

The cameras 211-1 through to 211-8 have, for example, a communication function based on an Internet portal (IP), and transmit video data obtained by photography to the Ethernet switch 213, via the respective cables 212-1 through to 212-8.

The Ethernet switch 213 transmits the video data transmitted from the cameras 211-1 through to 211-8 via the cables 212-1 through to 212-8 to the video switcher 113, via the cable 214. Further, the Ethernet switch 213 can switch the video data to be transmitted to the video switcher 113, based on a request from the video switcher 113 or the like.

The sending system 215 is constituted, for example, by various types of broadcast equipment or the like which sends video data, and sends video data transmitted from the video switcher 113.

Note that, hereinafter, in the case where it may not be necessary to individually distinguish the cameras 211-1 through to 211-8, they will simply be called the camera 211. Further, in the case where it may not be necessary to individually distinguish the cables 212-1 through to 212-8, they will simply be called the cable 212. In addition, hereinafter, the video data of the cameras 211-1 through to 211-8 will be respectively called video data 1 through to 8.

[Video Switching Process of the Video Processing System 201]

Figure 3:
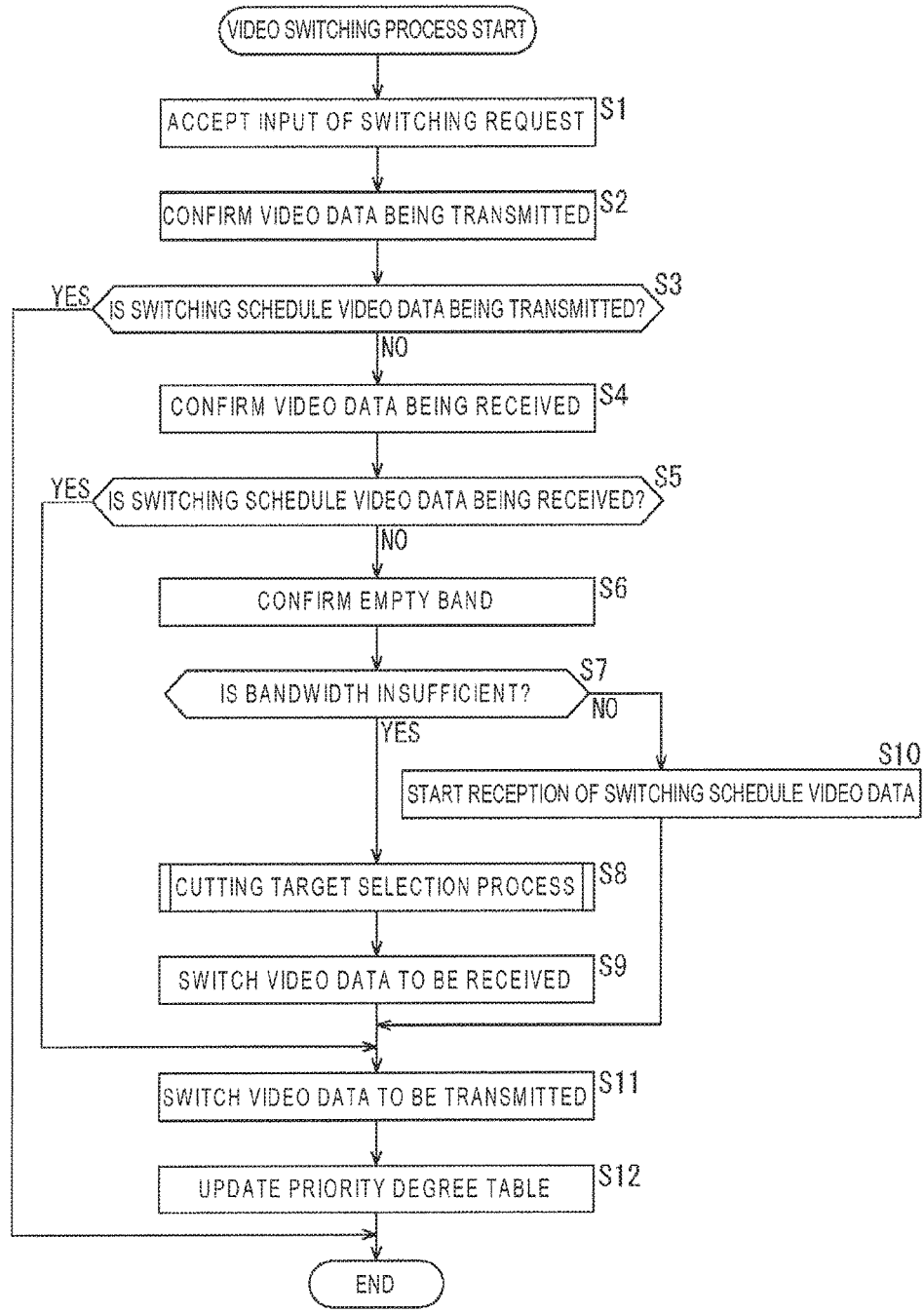
FIG. 3 is a flow chart for describing a video switching process.

Next, a video switching process executed by the video processing system 201 will be described by referring to the flow chart of FIG. 3 and the sequence diagram of FIG. 4.

In step S1, the video switcher 113 accepts an input of a switching request. Specifically, in the case where a user inputs a switching request of video data to be transmitted to the sending system 215, via the user interface unit 131, the user interface unit 131 supplies the input switching request to the control unit 132.

Figure 5:
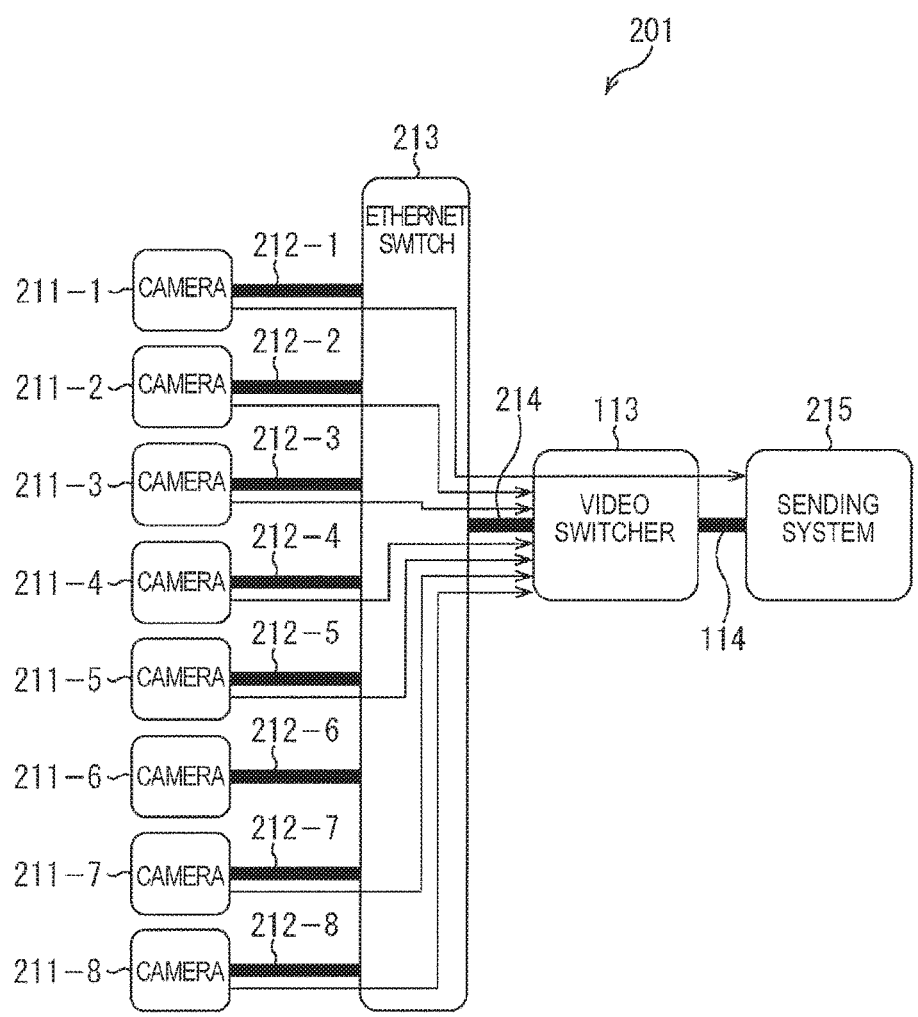
FIG. 5 is a figure which shows an example of the state of the video processing system prior to a switching of video data.

Note that, hereinafter, in the state where the video processing system 201 is shown in FIG. 5, the process of the case where switching video data to be transmitted to the sending system 215 from the video data 1 of the camera 211-1 to the video data 6 of the camera 211-6 will be described as an arbitrary specific example. Note that, in the state of FIG. 5, the video switcher 113 is receiving the video data 1 through to 5, the video data 7 and the video data 8, and is not receiving the video data 6. Further, the video switcher 113 transmits the video data 1 from among the video data being received to the sending system 215.

FIG. 6 shows an example of a priority degree table retained by the selection unit 133, in the state where the video processing system 201 is shown in FIG. 5. The priority degree table includes each of the items of a video ID, a transmission stop time, a receiving flag, a transmitting flag, and a usage band.

The video ID is an ID for identifying the video data of each camera 211. That is, respective video IDs 1 through to 8 are allocated to the video data of the cameras 211-1 through to 211-8.

The transmission stop time shows an elapsed time from when each piece of video data is transmitted from the video switcher 113 to the sending system 215 up until the present (the update time of the priority degree table). In other words, the transmission stop time shows an elapsed time from when a transmission of each piece of video data from the video switcher 113 to the sending system 215 is stopped up until the present.

For example, in this example, since the video data 1 is being transmitted to the sending system 215, the transmission stop time of the video data 1 is set to 00:00:00. Further, the transmission stop times of the video data 2 through to 8 are respectively set to 00:14:43, 00:05:01, 00:17:38, 00:08:22, 00:30:00, 00:04:33, and 00:02:15.

The receiving flag is a flag which shows whether or not the video switcher 113 is receiving each piece of video data. In this example, it shows that the video data 1 through to 5, the video data 7 and the video data 8 are being received, and the video data 6 is not being received.

The transmitting flag is a flag which shows whether or not the video switcher 113 is transmitting each piece of video data to the sending system 215. In this example, it shows that the video data 1 is being transmitted, and the video data 2 through to 8 are not being transmitted.

The usage band shows the bandwidth necessary for transferring each piece of video data. In this example, it shows that the usage bands of the video data 1 through to 8 are respectively 1.5 Gbps, 0.4 Gbps, 0.1 Gbps, 0.1 Gbps, 0.2 Gbps, 1.5 Gbps, 1.0 Gbps, and 1.5 Gbps.

Note that, an upper limit (maximum usable band) of the bandwidth capable of being used for a transmission of data from the Ethernet switch 213 to the video switcher 113 is 5.0 Gbps. That is, data of a bandwidth of at most 5.0 Gbps can be transmitted from the Ethernet switch 213 to the video switcher 113.

Further, hereinafter, video data requested so as to be newly transmitted to the sending system 215 by a switching request will be called switching schedule video data. In the above described specific example, the video data 6 becomes switching schedule video data.

Returning to FIG. 3, in step S2, the control unit 132 confirms the video data being transmitted. That is, the control unit 132 confirms whether or not the transmission unit 136 is transmitting video data from among the video data 1 through to 8 to the sending system 215.

In step S3, the control unit 132 decides whether or not the switching schedule video data is being transmitted. In the case where it is decided that the switching schedule video data is not being transmitted, the process proceeds to step S4.

For example, in the above described specific example, since the transmission unit 136 is not transmitting the video data 6 to the sending system 215, it is decided that the switching schedule video data is not being transmitted, and the process proceeds to step S4.

In step S4, the control unit 132 confirms the video data being received. That is, the control unit 132 confirms whether or not the reception unit 134 is receiving video data from among the video data 1 through to 8.

In step S5, the control unit 132 decides whether or not the switching schedule video data is being received. In the case where it is decided that the switching schedule video data is not being received, the process proceeds to step S6.

For example, in the above described specific example, since the reception unit 134 is not receiving the video data 6, it is decided that the switching schedule video data is not being received, and the process proceeds to step S6.

In step S6, the control unit 132 confirms an empty band. That is, the video switcher 113 confirms an empty band, which is the bandwidth not used for a transfer of the present video data, from within the maximum usable band between the Ethernet switch 213 and the video switcher 113.

For example, in the above described specific example, the sum of the usage bands of the video data 1 through to 5, 7 and 8 being received becomes 4.80 Gbps. On the other hand, since the maximum usable band is 5.00 Gbps, the empty band becomes 0.20 Gbps.

In step S7, the control unit 132 decides whether or not the bandwidth is insufficient. In the case where the empty band confirmed by the process of step S6 is lower than the usage band of the switching schedule video data (hereinafter, called a request band), which may be necessary to be newly received, the control unit 132 decides that the bandwidth is insufficient, and the process proceeds to step S8.

For example, in the above described specific example, while the request band (the usage band of the video data 6) is 1.50 Gbps, the empty band is 0.20 Gbps, and so it is decided that the bandwidth is insufficient, and the process proceeds to step S8.

In step S8, the video switcher 113 executes a cutting target selection process. Here, the details of the cutting target selection process will be described by referring to the flow chart of FIG. 7.

In step S31, the selection unit 133 calculates a necessary band. Specifically, the control unit 132 supplies a cutting target selection request signal to the selection unit 133. The cutting target selection process request signal includes, for example, information related to the switching schedule video data, the video data being transmitted, the video data being received, the empty band or the like.

The selection unit 133 obtains a value, in which the empty band is subtracted from the usage band of the switching schedule video data, as the necessary band. That is, the necessary band is the bandwidth which may be necessary to be newly secured for receiving the switching schedule video data.

In step S32, the selection unit 133 executes a cutting candidate selection process. Here, the details of the cutting candidate selection process will be described by referring to the flow chart of FIG. 8.

In step S51, the selection unit 133 sets a reception continuation priority order. Specifically, the selection unit 133 compares the priority degree table with information included in the cutting target selection request signal, and in the case where they do not match, updates the priority degree table, based on this information. Also, the selection unit 133 sets a reception continuation priority order in the order of the shortest transmission stop time, for the video data being presently received. Therefore, the reception continuation priority order of the video data being presently transmitted is set highest, and the reception continuation priority order of the video data with the longest transmission stop time is set lowest. Note that, the reception continuation priority order is not set for video data which is not being presently received.

Here, the reception continuation priority order is an order which shows whether a reception of video data is to be continued with priority, and cutting candidates are selected in the order from the video data with the lowest reception continuation priority order, such as will be described below.

In step S52, the selection unit 133 selects that with the lowest reception continuation priority order, from among the video data not selected for a cutting candidate, for the cutting candidate.

In step S53, the selection unit 133 adds the usage band of the selected video data to a cutting candidate band total. Here, the cutting candidate band total is a total of the usage bands of the video data selected for the cutting candidates, and is a bandwidth newly secured in the case where a reception of video data selected for the cutting candidates is to be stopped.

In step S54, the selection unit 133 decides whether or not the cutting candidate band total is a necessary band or higher. In the case where it is decided that the cutting candidate band total is less than a necessary band, the process proceeds to step S52.

Afterwards, in step S54, the processes of steps S52 through to S54 are repeatedly executed, up until it is decided that the cutting candidate band total is a necessary band or higher.

On the other hand, in step S54, in the case where it is decided that the cutting candidate band total is a necessary band or higher, the cutting candidate selection process ends.

In this way, cutting candidates are selected in the order from the video data with the lowest reception continuation priority order, up until the cutting candidate band total becomes a necessary band or higher. In other words, cutting candidates are selected in the order from the video data with the lowest reception continuation priority order, up until the total of the usage bands of the cutting candidates and the empty band becomes a request band or higher.

Here, the details of the cutting candidate selection process in the above described specific example will be described by referring to FIG. 9 and FIG. 10.

FIG. 9 is a table which shows a setting example of the reception continuation priority order in the above described specific example. The table of FIG. 9 includes each of the items of a video ID, a transmitting flag, a receiving flag, a reception request flag, a transmission stop time, a receiving video band, a request band, and a reception continuation priority order. From among these items, the video ID, the transmitting flag, the receiving flag and the transmission stop time are the same as those of the priority degree table of FIG. 6.

The reception request flag is a flag which shows whether a reception of video data has been requested, and a value for the switching schedule video data, which may be necessary to be newly received, is set to on. In this example, it shows that a reception of the video data 6 has been requested.

The receiving video band shows the usage bands of video data being received. In this example, the values of the usage bands of video data other than the video data 6, which is not being presently received, are respectively shown.

The request band sets the total of the usage bands of video data for which the reception request flag has been set to on, that is, the total of the usage band of the switching schedule video data, which may be necessary to be newly received. In this example, a value of the usage band of the video data 6, for which the reception request flag has been set to on, is shown.

Also, the reception continuation priority order is set in the order of the video data 1, the video data 8, the video data 7, the video data 3, the video data 5, the video data 2 and the video data 4, from that with the shortest transmission stop time, with the exception of the video data 6 which not being presently received.

FIG. 10 is a table which shows a selection result of the cutting candidates in the above described specific example. The table of FIG. 10 includes each of the items of a video ID, a reception continuation priority order, a cutting candidate band total, a surplus band, a necessary band reaching flag, a boundary detection, and a cutting candidate. From among these items, the video ID is the same as that of the priority degree table of FIG. 6, and the reception continuation priority order is the same as that of the table of FIG. 9.

The cutting candidate band total shows a value in which the usage band has been integrated in the order from the video data with the lowest reception continuation priority order. For example, the cutting candidate band total of the row of the video data 4 shows the usage band of the video data 4, the cutting candidate band total of the row of the video data 2 shows an integrated value of the usage bands of the video data 4 and the video data 2, and the cutting candidate band total of the row of the video data 5 shows an integrated value of the usage bands of the video data 4, the video data 2 and the video data 5.

The surplus band shows a value in which the necessary band has been subtracted from the cutting candidate band total. In the case where the value of the surplus band is negative, it means that the bandwidth of only this value is insufficient, and in the case where the value of the surplus band is positive, it means that the bandwidth of only this value remains.

The necessary band reaching flag is a flag which shows whether or not the cutting candidate band total has reached the necessary band, and in the case where the value of the surplus band is less than 0, it is set to off, and in the case where the value of the surplus band is 0 or higher, it is set to on.

The boundary detection shows the cutting candidate band total at the time when the cutting candidate band total has become the necessary band or higher.

The cutting candidate shows whether or not each piece of video data is a target of the cutting candidates.

Also, first, the video data 4 with the lowest place (7th place) cutting candidate exclusion priority order is selected for a cutting candidate. As a result of this, the cutting candidate band total becomes 0.1 Gbps, and the surplus band becomes −1.2 Gbps.

However, since the necessary bandwidth is not yet able to be secured, next, the video data 2 with the 6th place cutting candidate exclusion priority order is selected for a cutting candidate. As a result of this, the cutting candidate band total becomes 0.5 Gbps, and the surplus band becomes −0.8 Gbps.

However, since the necessary bandwidth is not yet able to be secured, next, the video data 5 with the 5th place cutting candidate exclusion priority order is selected for a cutting candidate. As a result of this, the cutting candidate band total becomes 0.7 Gbps, and the surplus band becomes −0.6 Gbps.

However, since the necessary bandwidth is not yet able to be secured, next, the video data 3 with the 4th place cutting candidate exclusion priority order is selected for a cutting candidate. As a result of this, the cutting candidate band total becomes 0.8 Gbps, and the surplus band becomes −0.5 Gbps.

However, since the necessary bandwidth is not yet able to be secured, next, the video data 7 with the 3rd place cutting candidate exclusion priority order is selected for a cutting candidate. As a result of this, the cutting candidate band total becomes 1.8 Gbps, and the surplus band becomes 0.5 Gbps. Here, since the necessary bandwidth can be secured, the selection of the cutting candidates ends. In this way, the video data 2 through to 5 and 7 are finally selected for the cutting candidates, and the video data 1 and 8 do not become a target of the cutting candidates.

Figure 11:
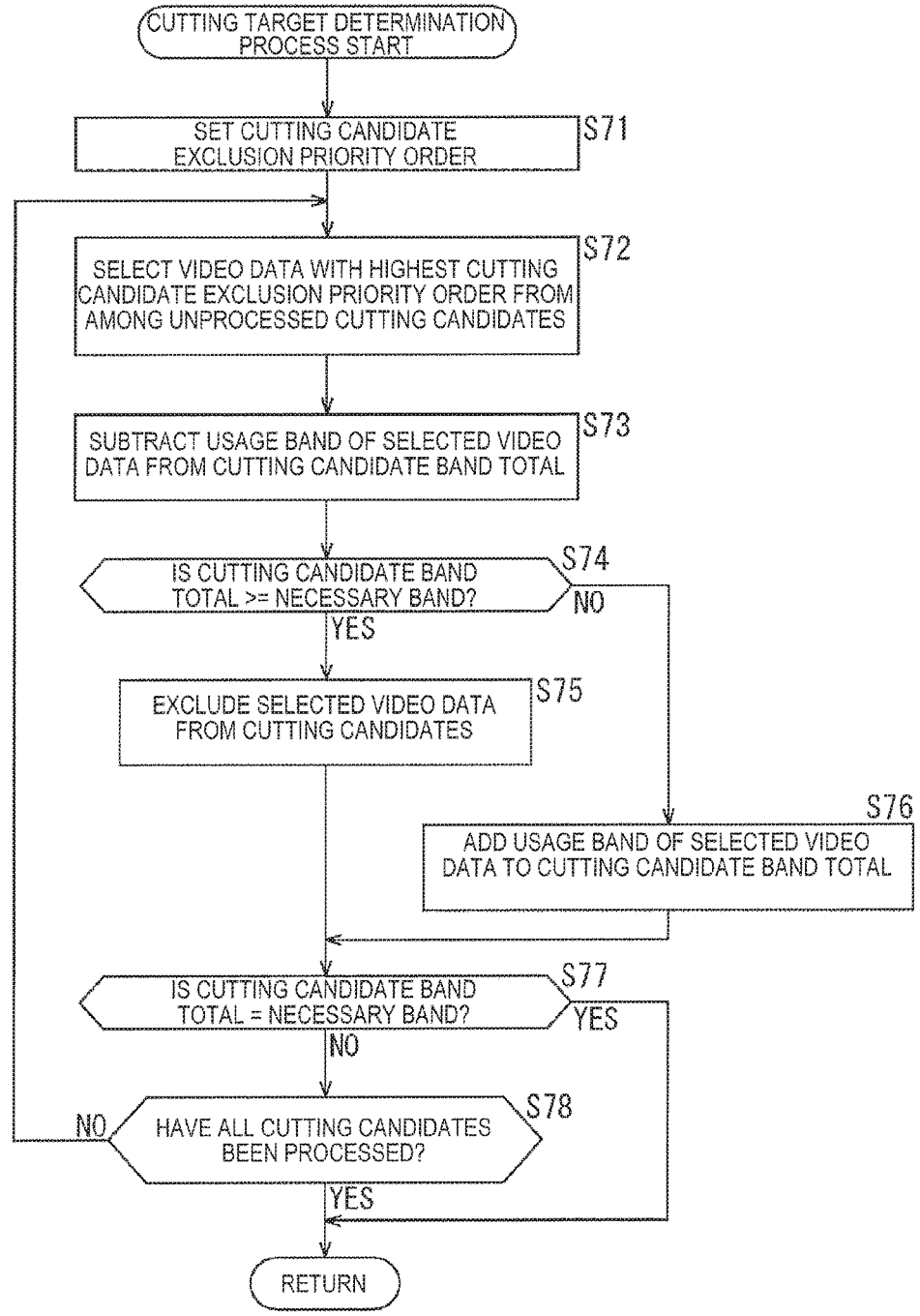
FIG. 11 is a flow chart for describing the details of a cutting target determination process.

Returning to FIG. 7, in step S33, the selection unit 133 executes a cutting target determination process. Here, the details of the cutting target determination process will be described by referring to the flow chart of FIG. 11.

In step S71, the selection unit 133 sets a cutting candidate exclusion priority order. Specifically, the selection unit 133 sets a cutting candidate exclusion priority order in the order of the highest original reception continuation priority order for the selected cutting candidates.

Here, the cutting candidate exclusion priority order is an order which shows whether video data is to be excluded with priority from among the selected cutting candidates, and an examination is performed for whether or not to exclude from the cutting candidates in the order from the video data with the highest cutting candidate exclusion priority order, such as will be described below.

In step S72, the selection unit 133 selects the video data with the highest cutting candidate exclusion priority order from among unprocessed cutting candidates. Here, the unprocessed cutting candidates are the video data which have not yet become a target of the cutting target determination process, from among the cutting candidates.

In step S73, the selection unit 133 subtracts the usage band of the selected video data from the cutting candidate band total.

In step S74, the selection unit 133 decides whether or not the cutting candidate band total is the necessary band or higher. In the case where it is decided that the cutting candidate band total is the necessary band or higher, that is, in the case where the necessary band can be secured, even if the selected video data is excluded from the cutting candidates, the process proceeds to step S75.

In step S75, the selection unit 133 excludes the selected video data from the cutting candidates.

Afterwards, the process proceeds to step S77.

On the other hand, in step S74, in the case where it is decided that the cutting candidate band total is less than the necessary band, that is, in the case where the necessary band is not able to be secured when excluding the selected video data from the cutting candidates, the process proceeds to step S76.

In step S76, the selection unit 133 adds the usage band of the selected video data to the cutting candidate band total. In this way, the cutting candidate band total returns to the value prior to being subtracted in the process of step S72.

Afterwards, the process proceeds to step S77.

In step S77, the selection unit 133 decides whether or not the cutting candidate band total is equal to the necessary band. In the case where it is decided that the cutting candidate band total is not equal to the necessary band, the process proceeds to step S78. Here, there will be cases where the cutting candidate band total is greater than the necessary band, and there will be cases where there is still room to reduce the cutting candidates.

In step S78, the selection unit 133 decides whether or not all of the cutting candidates have been processed. In the case where it is decided that all of the cutting candidates have not yet been processed, the process returns to step S72.

Afterwards, the processes of steps S72 through to S78 are repeatedly executed up until, in step S77, it is decided that the cutting candidate band total is equal to the necessary band, or in step S78, it is decided that all of the cutting candidates have been processed.

On the other hand, in step S78, in the case where it is decided that all of the cutting candidates have been processed, the cutting target determination process ends.

Further, in step S77, in the case where it is decided that the cutting candidate band total is equal to the necessary band, there is no room to reduce the cutting candidates any further, and so the cutting target determination process ends.

Here, the details of the cutting target determination process in the above described specific example will be described by referring to FIG. 12. The table of FIG. 12 includes the items of a video ID, a cutting candidate exclusion priority order, a surplus band, a cutting candidate exclusion propriety, a cutting candidate exclusion band total, a cutting target band total, and a final decision. From among these items, the video ID is the same as that of the priority degree table of FIG. 6.

The cutting candidate exclusion priority order is set in the order of the video data 7, the video data 3, the video data 5, the video data 2 and the video data 4, from that with the highest original reception continuation priority order, from among the selected cutting candidates, such as shown in this table.

The surplus band shows a value in which the necessary band has been subtracted from the cutting candidate band total. In the case where the value of the surplus band is negative, it means that the band is insufficient by this value, and in the case where the value of the surplus band is positive, it means the band of only this value remains.

The cutting candidate exclusion propriety shows whether or not the video data to be targeted can be excluded from the cutting candidates.

The cutting candidate exclusion band total shows a total of the usage bands of the video data excluded from the cutting candidates.

The cutting target band total shows a total of the usage bands of the video data (the cutting targets) not excluded from the cutting candidates.

The final decision shows a final decision result of whether or not to cut the video data to be targeted. The video data shown as "cut" is video data determined for the cutting targets and for which reception is to be stopped, and the video data shown as "reception continuing" is video data excluded from the cutting candidates and for which reception is to be continued.

Also, first, a case will be examined where the video data 7 with the highest place (1st place) cutting candidate exclusion priority order has been excluded from the cutting candidates. In this case, since the cutting candidate band total becomes 0.80 Gbps and the necessary band is 1.3 Gbps, the surplus band becomes −0.50 Gbps, and the necessary band is not able to be secured. Therefore, the video data 7 is not excluded from the cutting candidates. Also, the cutting candidate exclusion band total becomes 0.0 Gbps as it is, and the cutting target band total becomes 1.0 Gbps.

Next, a case will be examined where the video data 3 with the second place cutting candidate exclusion priority order has been excluded from the cutting candidates. In this case, since the cutting candidate band total becomes 1.7 Gbps and the necessary band is 1.3 Gbps, the surplus band becomes 0.4 Gbps, and the necessary band can be secured. Therefore, the video data 3 is excluded from the cutting candidates. Also, the cutting candidate exclusion band total becomes 0.1 Gbps, and the cutting target band total becomes 1.0 Gbps as it is.

Next, a case will be examined where the video data 5 with the third place cutting candidate exclusion priority order has been excluded from the cutting candidates. In this case, since the cutting candidate band total becomes 1.5 Gbps and the necessary band is 1.3 Gbps, the surplus band becomes 0.2 Gbps, and the necessary band can be secured. Therefore, the video data 5 is excluded from the cutting candidates. Also, the cutting candidate exclusion band total becomes 0.3 Gbps, and the cutting target band total becomes 1.0 Gbps as it is.

Next, a case will be examined where the video data 2 with the fourth place cutting candidate exclusion priority order has been excluded from the cutting candidates. In this case, since the cutting candidate band total becomes 1.1 Gbps and the necessary band is 1.3 Gbps, the surplus band becomes −0.2 Gbps, and the necessary band is not able to be secured. Therefore, the video data 2 is not excluded from the cutting candidates. Also, the cutting candidate exclusion band total becomes 0.3 Gbps as it is, and the cutting target band total becomes 1.4 Gbps.

Finally, a case will be examined where the video data 4 with the lowest place (5th place) cutting candidate exclusion priority order has been excluded from the cutting candidates. In this case, since the cutting candidate band total becomes 1.4 Gbps and the necessary band is 1.3 Gbps, the surplus band becomes 0.1 Gbps, and the necessary band can be secured. Therefore, the video data 4 is excluded from the cutting candidates. Also, the cutting candidate exclusion band total becomes 0.4 Gbps, and the cutting target band total becomes 1.4 Gbps as it is.

Also, the video data 3 and the video data 4, which are the cutting candidates finally remaining, are determined as cutting targets.

In this way, the cutting targets can be restricted to a necessary minimum, while prioritizing the continuation of a reception of video data with a high priority degree (reception continuation priority order), within a range in which the cutting target band total becomes the necessary band or higher.

Figure 8:
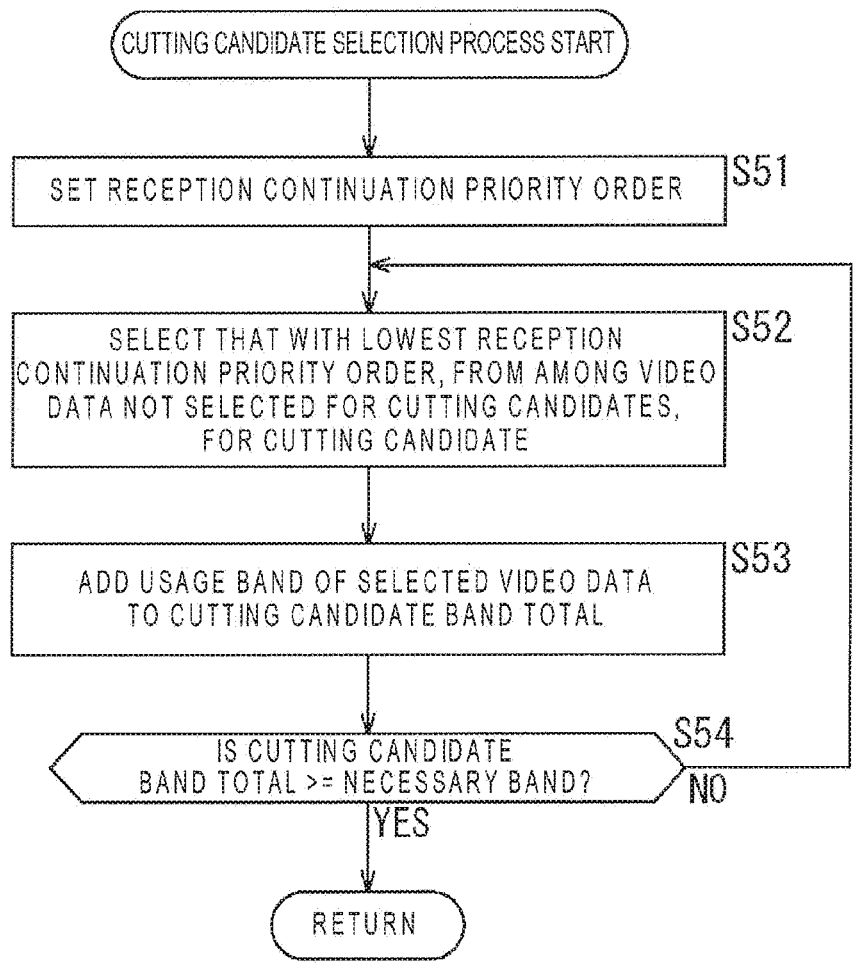
FIG. 8 is a flow chart for describing the details of a cutting candidate selection process.

Note that, the video data with the highest cutting candidate exclusion priority order from among the cutting candidates (hereinafter, called a final cutting candidate) is the video data finally selected for a cutting candidate, in the cutting candidate selection process of FIG. 8. That is, the cutting candidate band total becomes the necessary band or higher for the first time, at the time when the final cutting candidate has been added to the cutting candidates. Therefore, since the cutting candidate band total will surely become less than the necessary band when the final cutting candidate is excluded from the cutting candidates, the final cutting candidate may be removed from a target for examining an exclusion from the cutting candidates, or may be automatically determined as a cutting target. Further, similarly for the cutting candidates with a usage band equal to or higher than that of the final cutting candidate, they may be removed from a target for examining an exclusion from the cutting candidates, or may be automatically determined as a cutting target. In this way, the calculation amount can be reduced, and the processes can be made faster.

Returning to FIG. 3, in step S9, the video switcher 113 switches the video data to be received. Specifically, the selection unit 133 supplies a response signal for the cutting target selection request signal to the control unit 132. This response signal includes, for example, information which shows the switching schedule video data and the cutting targets.

The control unit 132 supplies a reception switching request signal to the reception unit 134. The reception switching request signal includes, for example, information which shows the switching schedule video data and the cutting targets.

The reception unit 134 transmits a transmission stop request signal, which requests stopping of a transmission of the video data selected for the cutting targets, to the Ethernet switch 213 via the cable 214.

The Ethernet switch 213 receiving the transmission stop request signal stops a transmission of the video data selected for the cutting targets. In this way, a reception of the video data of the cutting targets by the reception unit 134 of the video switcher 113 is stopped, and the empty band is expanded.

Further, the reception unit 134 transmits a transmission start request signal, which requests a start of a transmission of the switching schedule video data, to the Ethernet switch 213 via the cable 214.

The Ethernet switch 213 starts a transmission of the switching schedule video data. In this way, the reception unit 134 of the video switcher 113 starts a reception of the switching schedule video data. Also, the reception unit 134 supplies a response signal for the reception switching request signal to the control unit 132.

Afterwards, the process proceeds to step S11.

On the other hand, in step S7, in the case where the empty band confirmed in the process of step S6 is the request band or higher, it is decided that the bandwidth is not insufficient, and the process proceeds to step S10.

In step S10, the video switcher 113 starts a reception of the switching schedule video data. Specifically, the selection unit 133 supplies a response signal for the cutting target selection request signal to the control unit 132. This response signal includes, for example, information which shows the switching schedule video data.

The control unit 132 supplies a reception switching request signal to the reception unit 134. The reception switching request signal includes, for example, information which shows the switching schedule video data.

The reception unit 134 transmits a transmission start request signal, which requests a start of a transmission of the switching schedule video data, to the Ethernet switch 213 via the cable 214.

The Ethernet switch 213 starts a transmission of the switching schedule video data. In this way, the reception unit 134 of the video switcher 113 starts a reception of the switching schedule video data. Also, the reception unit 134 supplies a response signal for the reception switching request signal to the control unit 132.

Afterwards, the process proceeds to step S11.

On the other hand, in step S5, in the case where it is decided that the switching schedule video data is being received, the processes of steps S6 through to S10 are skipped, and the process proceeds to step S11.

In step S11, the video switcher 113 switches the video data to be transmitted. Specifically, the control unit 132 supplies a transmission switching request signal to the transmission unit 136. The transmission switching request signal includes, for example, information which shows the switching schedule video data.

The transmission unit 136 switches the video data to be transmitted to the sending system 215 via the cable 114 from the video data being presently transmitted to the switching schedule video data. Also, the transmission unit 136 supplies a response signal for the transmission switching request signal to the control unit 132.

Figure 13:
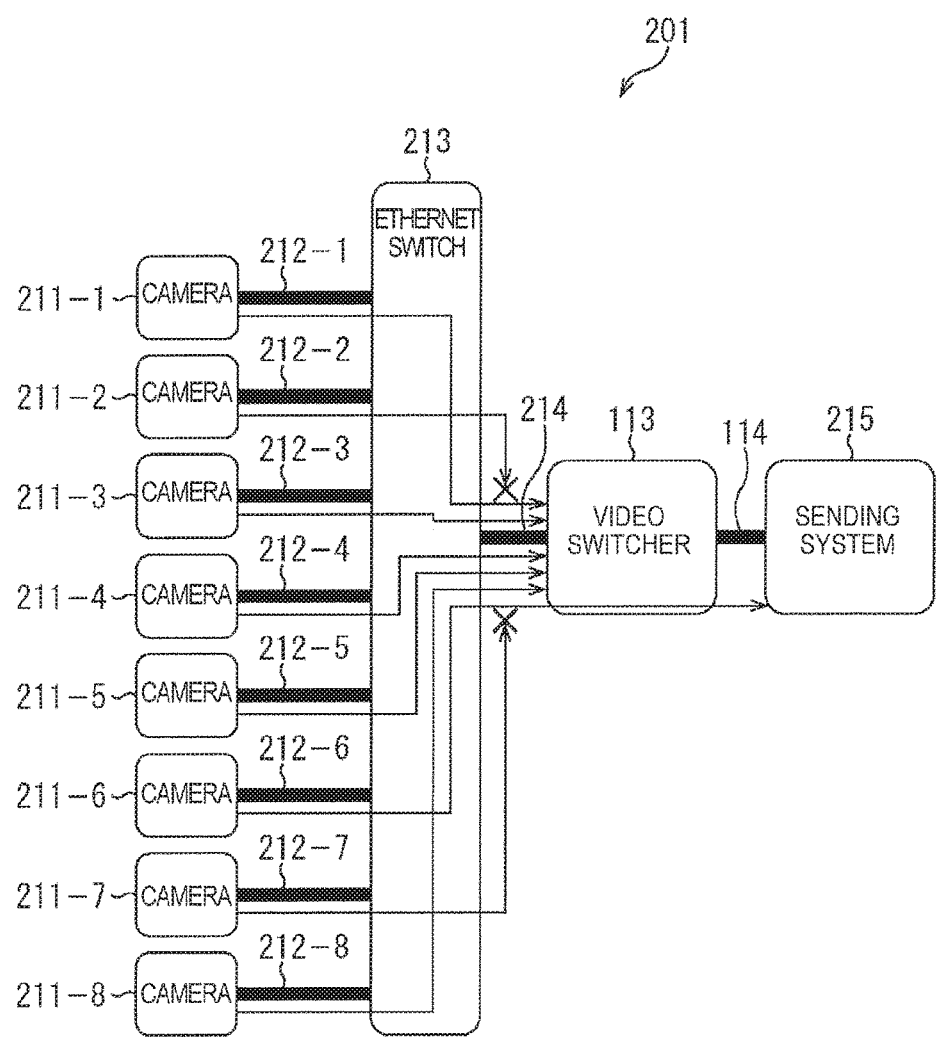
FIG. 13 is a figure which shows an example of the state of the video processing system after a switching of video data.

For example, in the case of the above described specific example, the state of the video processing system 201 changes from the state shown in FIG. 5 to the state shown in FIG. 13, by the processes up until here. That is, a transmission of the video data 2 and the video data 7 from the Ethernet switch 213 to the video switcher 113 is stopped, and a transmission of the video data 6 is started. Further, a transmission of the video data 1 from the video switcher 113 to the sending system 215 is stopped, and a transmission of the video data 6 is started.

In step S12, the video switcher 113 updates the priority degree table. Specifically, the control unit 132 supplies a switching completion notification signal to the selection unit 133. The switching completion notification signal includes, for example, a switching result of the transmission and reception of the video data.

Also, the selection unit 133 updates the priority degree table.

FIG. 14 shows an example after the video processing system 201 has changed to the state shown in FIG. 13, and after the priority degree table has been updated. As can be understood by comparing the priority degree table of FIG. 14 with the priority degree table of FIG. 6 prior to being updated, the values of the transmission stop time, the receiving flag and the transmitting flag of each piece of video data are updated, in accordance with the switching of the transmission and reception of the video data and the passing of time.

The selection unit 133 supplies a response signal for the switching completion notification signal to the control unit 132, after the updating of the priority degree table. The control unit 132 supplies a response signal for the switching request signal to the user interface unit 131. The user interface unit 131 returns a response for a switching request for a user, for example, by a method such as presenting a response screen or sounding a sound effect.

Afterwards, the video switching process ends.

On the other hand, in step S3, in the case where it is decided that the switching schedule video data is being transmitted, the processes of steps S4 through to S12 are skipped, and the video switching process ends.

As described above, the video data to be received by the video switcher 113 is sifted through, so as not to exceed the maximum usable band of the network. In this way, a loss of video data or a deterioration of image quality is prevented.

Further, in the case where the priority degree of the video data (reception continuation priority order) is dynamically set based on the transmission stop time, and the bandwidth is insufficient, the video data which for which reception is to be stopped is selected, based on this priority degree. Further, the cutting candidates are selected, and then afterwards the video data to be excluded from the cutting candidates is selected, so that the cutting targets become a minimum, based on the priority degree of the video data (cutting candidate exclusion priority order).

In this way, video data can be efficiently transferred from the cameras 211-1 through to 211-8 to the video switcher 113, within a range of the maximum usable band of the network. In other words, the video switcher 113 can receive, with priority as much as possible, video data with a higher priority degree, that is, video data with a higher probability of being transmitted to the sending system 215. As a result of this, for example, in the case where the video switcher 113 switches the video data to be transmitted to the sending system 215, there will be a high probability that video data to be newly transmitted has already been received, the processes will be made faster, and the switching frequency of the video data to be received can be reduced.

2. Modified Examples

Hereinafter, modified examples of the above described embodiment of the present disclosure will be described.

Modified Example 1: Modified Example Related to a Selection Method of the Cutting Targets In the above described description, while an example has been shown in which the video switcher 113 selects the cutting targets, a user may select the cutting targets from among the cutting candidates.

Figure 15:
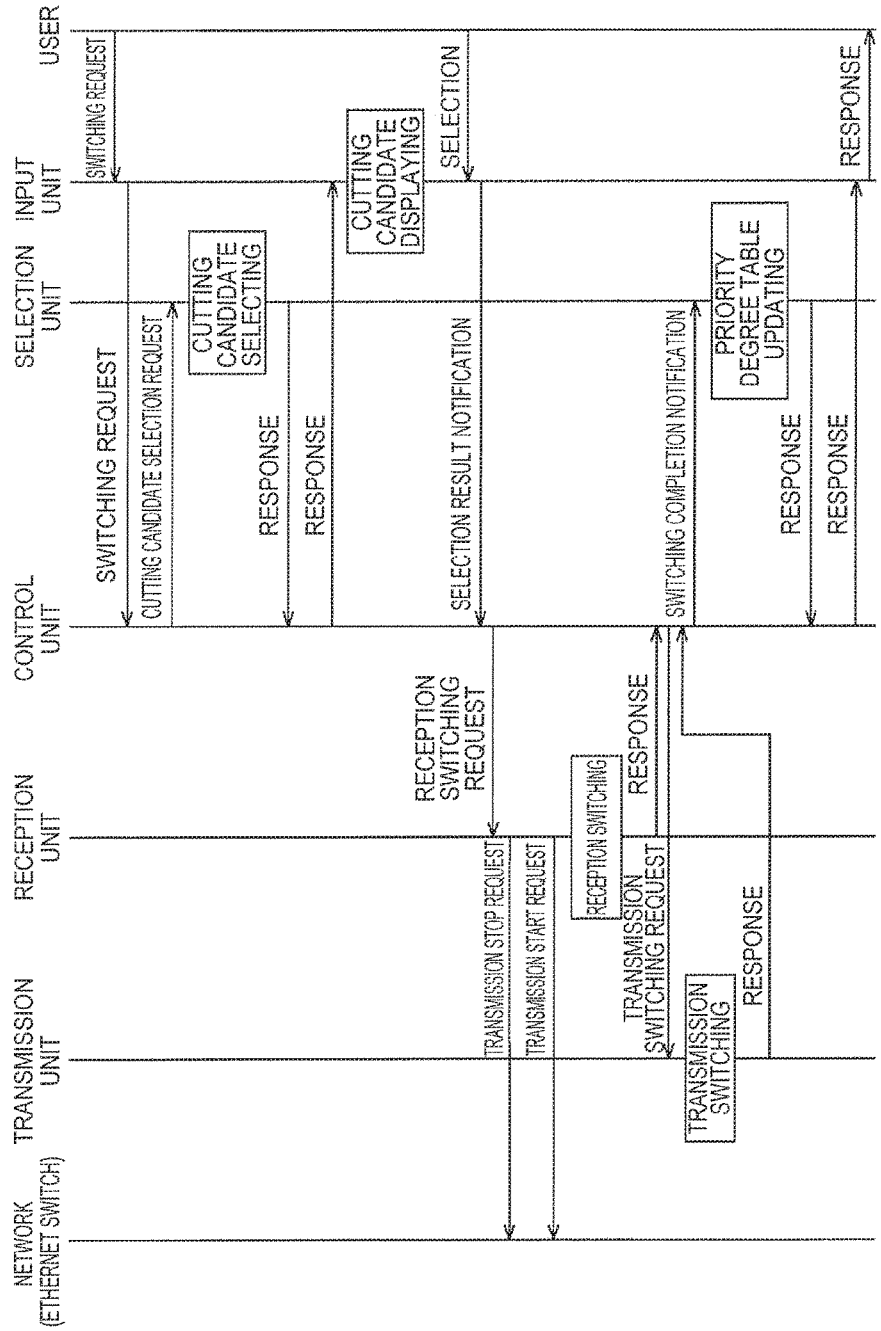
FIG. 15 is a sequence diagram for describing a modified example of a video switching process.

FIG. 15 shows a sequence diagram of a video switching process executed by the video processing system 201 in the case where a user selects the selection targets.

In the case where a switching request has been input from a user, the user interface unit 131 of the video switcher 113 supplies a switching request signal to the control unit 132.

The control unit 132 supplies a cutting candidate selection request signal to the selection unit 133.

The selection unit 133 selects the cutting candidates by the above described process, and supplies a response signal for the cutting candidate selection request signal to the control unit 132. The cutting candidate selection request signal includes, for example, a selection result of the cutting candidates.

The control unit 132 supplies a response signal for the switching request to the user interface unit 131. This response signal includes, for example, a selection result of the cutting candidates.

Figure 16:
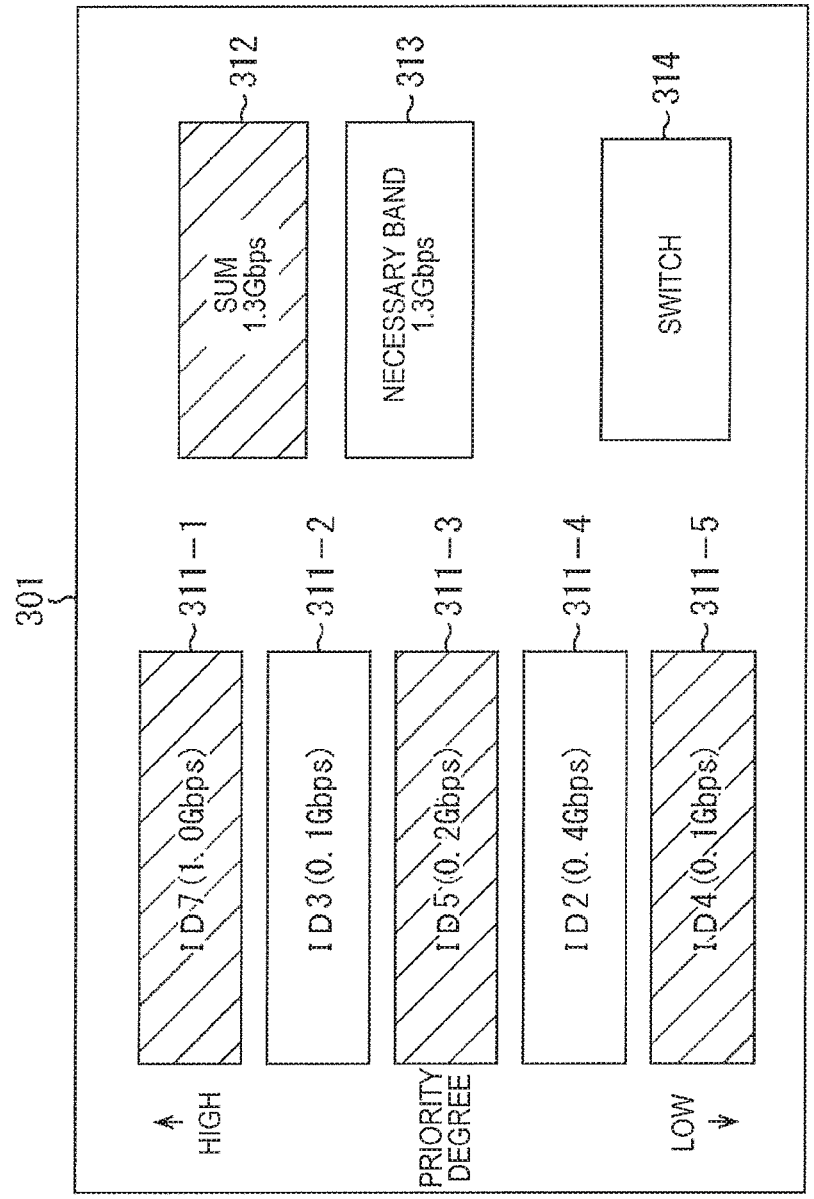
FIG. 16 is a figure which shows an example of a cutting target selection screen.

The user interface unit 131 displays, for example, a cutting target selection screen 301 shown in FIG. 16.

On the left half of the cutting target selection screen 301, selection buttons 311-1 through to 311-5 for accepting a selection for the cutting candidates are displayed. The selection buttons 311-1 through to 311-5 respectively correspond to different cutting candidates, and in the case of this example, the selection buttons 311-1 through to 311-5 respectively correspond to the video data 7, the video data 3, the video data 5, the video data 2 and the video data 4, which are the cutting candidates. Further, the video IDs and the usage bands of the corresponding video data are displayed on the selection buttons 311-1 through to 311-5. In addition, the video data corresponding to the selection buttons 311-1 through to 311-5 are arranged from the top in the order of the highest priority degree (reception continuation priority order).

In this way, the selection candidates are presented to a user along with the priority degree.

A user can select a cutting target from among the cutting candidates, and can release a selection, by specifying the selection buttons 311-1 through to 311-5. Further, the selection buttons 311-1 through to 311-5 are displayed so as to be able to distinguish the buttons corresponding to the video data selected for the cutting targets and the buttons that are not. In this example, the video data corresponding to the selection button 311-1, the selection button 311-3 and the selection button 311-5 are selected for the cutting targets, and the video data corresponding to the selection button 311-2 and the selection button 311-4 are not selected for the cutting targets.

On the right half of the cutting target selection screen 301, a window 312, a window 313 and a switching button are displayed. A sum of the usage bands of the video data selected for the present cutting targets is displayed in the window 312. A necessary band is displayed in the window 313. The switching button 314 determines the cutting targets, and is operated in the case where the transmission and reception of video data is switched.

In this way, a user can select video data to be excluded from the cutting candidates, within a range in which a necessary band can be simply secured, and can select desired video data for cutting targets.

Also, when a user presses the switching button 314, and a selection result is input to the user interface unit 131, the user interface unit 131 supplies a selection result notification signal, which shows a selection result of the cutting targets, to the control unit 132.

Figure 4:
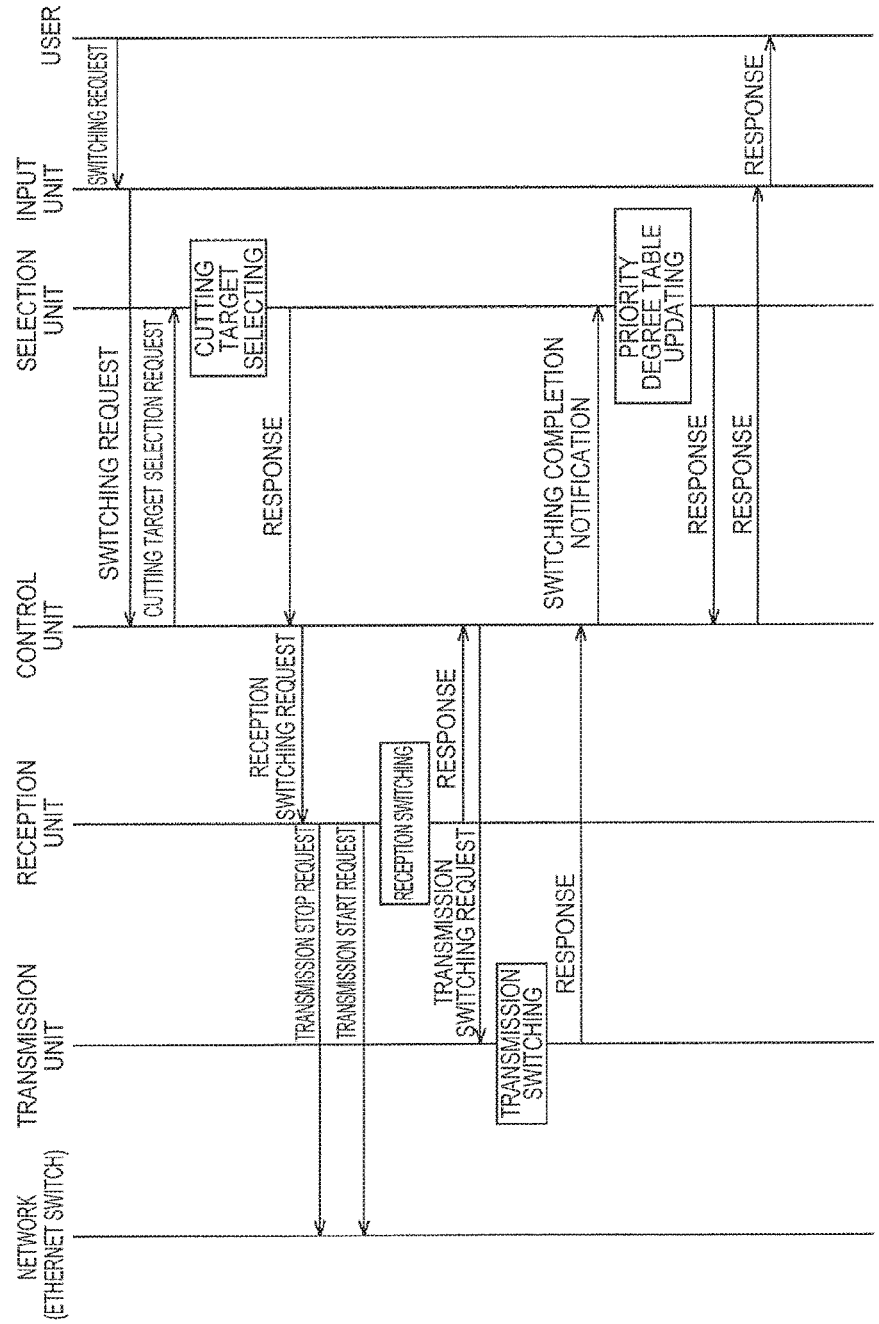
FIG. 4 is a sequence diagram for describing a video switching process.

Afterwards, processes similar to those of the case of FIG. 4 are performed.

Figure 7:
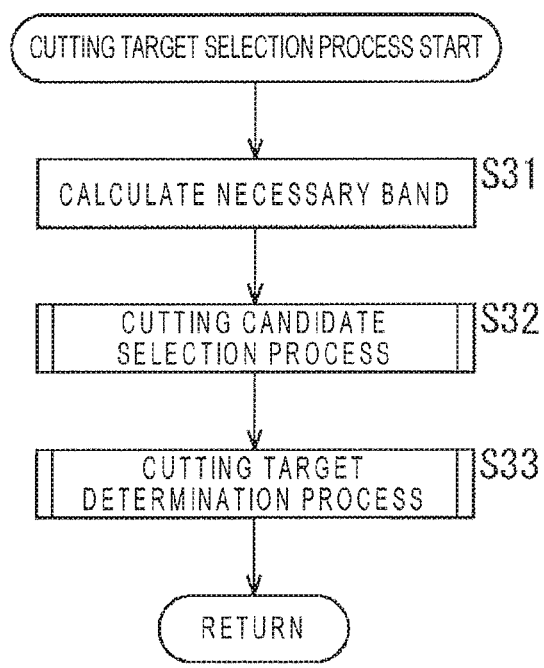
FIG. 7 is a flow chart for describing the details of a cutting target selection process.

Further, for example, the cutting target determination process of step S33 of FIG. 7 may be omitted. That is, all reception may be stopped, without reducing the selected cutting candidates.

Modified Example 2: Modified Example Related to the Configuration of the Video Processing System In the above described description, while an example has been shown which sets the number of the video switchers 113 connected to the network 112 (Ethernet switch 213) to one, it may be connected to two or more. In the case of being connected to two or more, it is possible for each of the video switchers 113 to respectively execute the above described video switching process independently.

Figure 17:
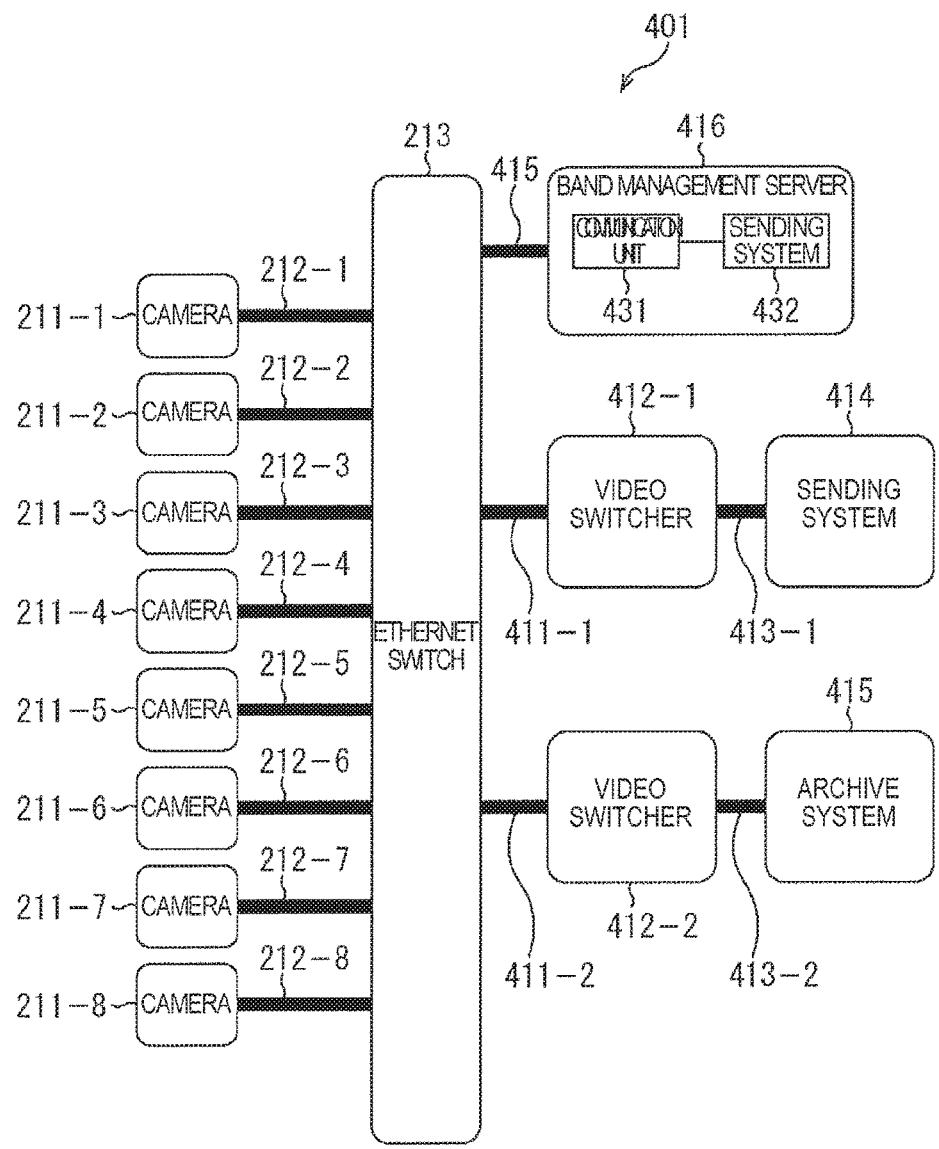
FIG. 17 is a block diagram which shows a modified example of the video processing system.

Further, for example, the video switchers may be installed in separate servers or the like, by making a part of the functions of the video switchers (for example, the selection unit 133 or the like) independent, such as shown in FIG. 17.

Specifically, the video processing system 401 of FIG. 17 is constituted by including cameras 211-1 through to 211-8, cables 212-1 through to 212-8, an Ethernet switch 213, cables 411-1 and 411-2, video switchers 412-1 and 412-2, cables 413-1 and 413-2, a sending system 414, an archive system 415, a cable 416, and a band management server 417. Note that, within the figure, the same reference numerals are attached to portions corresponding to those of FIG. 2.

The cameras 211-1 through to 211-8 are individually connected to the Ethernet switch 213, via the cables 212-1 through to 212-8. Further, the Ethernet switch 213 is connected to the video switcher 412-1 via the cable 411-1, is connected to the video switcher 412-2 via the cable 411-2, and is connected to the band management server 417 via the cable 416. That is, in this example, the network 112 of FIG. 1 is constituted so as to include the cables 212-1 through to 212-8, the Ethernet switch 213, the cables 411-1 and 411-2, and the cable 416. Further, the video switcher 412-1 is connected to the sending system 414 via the cable 413-1. The video switcher 412-2 is connected to the sending system 414 via the cable 413-2.

While an illustration is omitted, the video switchers 412-1 and 412-2 have, for example, configurations in which the selection unit 133 from the video switcher 113 of FIG. 1 has been removed.

The band management server 417 is constituted so as to include a communication unit 431 and a selection unit 432.

The communication unit 431 performs communication with the Ethernet switch 213 via the cable 416.

The selection unit 432 has a function approximately the same as that of the selection unit 133 of the video switcher 113 of FIG. 1. That is, the selection unit 432 dynamically sets a priority degree of the video data from the cameras 211-1 through to 211-8, for each of the video switchers, based on information supplied from the video switchers 412-1 and 412-2, and updates a priority degree table which shows the set priority degrees. Further, the selection unit 432 selects the video data to be received from the cameras 211-1 through to 211-8 by each of the video switchers, based on the set priority degrees, the usage bands of each piece of video data, the maximum usable band or the like. Also, the selection unit 432 transmits a selection result of the video data to be received to the video switcher 412-1 or the video switcher 412-2, via the communication unit 431, the cable 416, the Ethernet switch 213, and the cable 411-1 or the cable 411-2.

The video switcher 412-1 and the video switcher 412-2 perform switching of the video data to be received, based on the selection result supplied from the band management server 417.

In this way, the functions of the video switchers can be simplified. Further, it can easily correspond to an increase or decrease of the number of video switchers, by only updating the setting of the band management server 417 or the like. In addition, for example, it is possible to include a function which performs arbitration or the like of the processes between video switchers in the band management server 417, and to cooperatively operate a plurality of video switchers.

Further, the configuration and communication system of a network capable of being applied to the present disclosure is not limited to the above described example, and it is possible to adopt another configuration and communication system. For example, it is possible to adopt a communication system based on a protocol other than IP. Further, for example, it is possible to be applied to a network of a configuration in which an Ethernet switch is connected in two or more stages in series. In addition, in the above described example, while an example has been shown which performs communication between each apparatus by wires, it is also possible to be changed to wireless communication.

Modified Example 3: Modified Example Related to a Transfer Target

Heretofore, while a description of a video switching process has been made by including, as an example, the case where transmitting one video data from the video switcher 113 to the sending system 215, in the case where transmitting two or more video data to the sending system 215, the video data to be transmitted and received can be switched by a same process. For example, in the case where there is one or more pieces of video data which may be necessary to be newly received, from among two or more video data to be newly transmitted, the video data for which reception is to be stopped may be selected based on a priority degree, so as to be able to secure a band of the video data which may be necessary to be newly received, by the above described process. Note that, not only the case where individually transmitting two or more video data, but also the case where combining and transmitting two or more video data as one, is included for the case where transmitting two or more video data.

Further, it is possible for the present disclosure to also be applied to the case where transferring content other than video data, such as audio data. Further, the present disclosure can also be applied to the case where transferring a plurality of various types of content.

[Computer Configuration Example]

The series of processes described above can be executed by hardware but can also be executed by software. When the series of processes is executed by software, a program that constructs such software is installed into a computer. Here, the expression "computer" includes a computer in which dedicated hardware is incorporated and a general-purpose personal computer or the like that is capable of executing various functions when various programs are installed.

Figure 18:
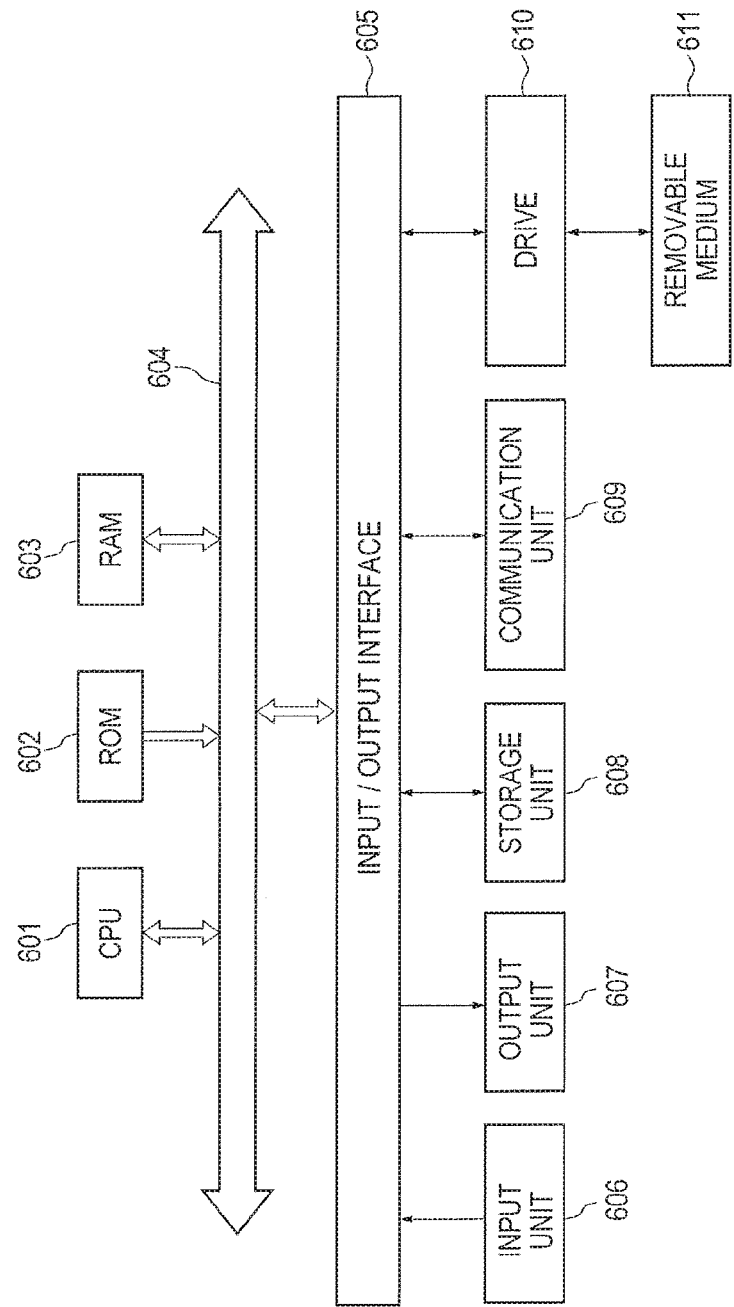
FIG. 18 is a block diagram which shows an example of a configuration of a computer.

FIG. 18 is a block diagram showing an example configuration of the hardware of a computer that executes the series of processes described earlier according to a program.

In a computer, a CPU (Central Processing Unit) 601, a ROM (Read Only Memory) 602, and a RAM (Random Access Memory) 603 are mutually connected by a bus 604.

An input/output interface 605 is also connected to the bus 604. An input unit 606, an output unit 607, a storage unit 608, a communication unit 609, and a drive 610 are connected to the input/output interface 605.

The input unit 606 is configured from a keyboard, a mouse, a microphone or the like. The output unit 607 configured from a display, a speaker or the like. The storage unit 608 is configured from a hard disk, a non-volatile memory or the like. The communication unit 609 is configured from a network interface or the like. The drive 610 drives a removable medium 611 such as a magnetic disk, an optical disk, a magneto-optical disk, a semiconductor memory or the like.

In the computer configured as described above, as one example the CPU 601 loads a program stored in the storage unit 608 via the input/output interface 605 and the bus 604 into the RAM 603 and executes the program to carry out the series of processes described earlier.

As one example, the program executed by the computer (the CPU 601) may be provided by being recorded on the removable medium 611 as a packaged medium or the like. The program can also be provided via a wired or wireless transfer medium, such as a local area network, the Internet, or a digital satellite broadcast.

In the computer, by loading the removable medium 611 into the drive 610, the program can be installed into the storage unit 608 via the input/output interface 605. It is also possible to receive the program from a wired or wireless transfer medium using the communication unit 609 and install the program into the storage unit 608. As another alternative, the program can be installed in advance into the ROM 602 or the storage unit 608.

Note that the program executed by the computer may be a program in which processes are carried out in a time series in the order described in this specification or may be a program in which processes are carried out in parallel or at necessary timing, such as when the processes are called.

Further, in the present disclosure, a system has the meaning of a set of a plurality of configured elements (such as an apparatus or a module (part)), and does not take into account whether or not all the configured elements are in the same casing. Therefore, the system may be either a plurality of apparatuses, stored in separate casings and connected through a network, or a plurality of modules within a single casing.

An embodiment of the disclosure is not limited to the embodiments described above, and various changes and modifications may be made without departing from the scope of the disclosure.

For example, the present disclosure can adopt a configuration of cloud computing which processes by allocating and connecting one function by a plurality of apparatuses through a network.

Further, each step described by the above-mentioned flow charts can be executed by one apparatus or by allocating a plurality of apparatuses.

In addition, in the case where a plurality of processes are included in one step, the plurality of processes included in this one step can be executed by one apparatus or by sharing a plurality of apparatuses.

Additionally, the present technology may also be configured as below.

(1)

A video switching apparatus including:

a reception unit which receives video data within a range of a prescribed bandwidth via a network from a plurality of first apparatuses;

a transmission unit which selects one or more pieces from among received video data, and transmits the selected one or more pieces to a second apparatus which sends video data;

a selection unit which dynamically sets a priority degree of each piece of video data, and selects video data to be received from the plurality of first apparatuses based on the priority degree; and a transmission and reception control unit which controls a transmission and reception of video data, wherein, in a case where a bandwidth necessary for a reception of new video data is insufficient, the selection unit selects video data for which reception is to be stopped from among video data being received based on the priority degree, and wherein the transmission and reception control unit performs a control in a manner that a reception of selected video data is stopped and a reception of the new video data is started.

(2)

The video switching apparatus according to (1), wherein the selection unit sets the priority degree of each piece of video data based on an elapsed time from when stopping a transmission to the second apparatus.

(3)

The video switching apparatus according to (2), wherein the selection unit sets a highest priority degree of video data being transmitted to the second apparatus.

(4)

The video switching apparatus according to any one of (1) to (3), wherein the selection unit selects, up until a total of usage bands of candidates of video data for which reception is to be stopped and a presently empty band becomes a usage band of the new video data or higher, the candidates in an order of the lowest priority degree from among video data being received, and afterwards selects video data to be excluded from the candidates in a range where a total of usage bands of the candidates and a presently empty band does not become a usage band of the new video data or lower, and wherein the transmission and reception control unit performs a control in a manner that a reception of video data finally remaining in the candidates is stopped.

(5)

The video switching apparatus according to any one of (1) to (3), wherein the selection unit selects, up until a total of candidates of video data for which reception is to be stopped and a presently empty band becomes a usage band of the new video data or higher, the candidates in an order of the lowest priority degree from among video data being received, wherein the video switching apparatus further includes a user interface unit which performs a control in a manner that the selected candidates are presented along with the priority degrees, and accepts a selection for the presented candidates, and wherein the transmission and reception control unit performs a control in a manner that a reception of video data selected from among the candidates is stopped.

(6)

A video switching method, by a video switching apparatus which receives video data within a range of a prescribed bandwidth via a network from a plurality of first apparatuses, selects one or more pieces from among received video data, and transmits the selected one or more pieces to a second apparatus which sends video data, the method including the steps of:

dynamically setting a priority degree of each piece of video data;

selecting, in a case where a bandwidth necessary for a reception of new video data is insufficient, video data for which reception is to be stopped from among video data being received based on the priority degree; and performing a control in a manner that a reception of selected video data is stopped and a reception of the new video data is started.

(7)

A program for causing a computer of a video switching apparatus which receives video data within a range of a prescribed bandwidth via a network from a plurality of first apparatuses, selects one or more pieces from among received video data, and transmits the selected one or more pieces to a second apparatus which sends video data, to perform a process including the steps of:

dynamically setting a priority degree of each piece of video data:

selecting, in a case where a bandwidth necessary for a reception of new video data is insufficient, video data for which reception is to be stopped from among video data being received based on the priority degree; and performing a control in a manner that a reception of selected video data is stopped and a reception of the new video data is started.

(8)

An information processing apparatus including:

a selection unit which dynamically sets a priority degree of each piece of video data being received by a video switching apparatus which receives video data within a range of a prescribed bandwidth via a network from a plurality of first apparatuses, selects one or more pieces from among received video data, and transmits the selected one or more pieces to a second apparatus which sends video data, and in a case where a bandwidth necessary for a reception of new video data is insufficient, selects video data for which reception is to be stopped from among video data being received by the video switching apparatus based on the priority degree; and a communication unit which notifies selected video data to the video switching apparatus.

REFERENCE SIGNS LIST 101 video processing system
111 video output apparatus
112 network
113 video switcher
114 cable
115 video processing apparatus
131 user interface unit
132 control unit
133 selection unit
134 reception unit
135 editing unit
136 transmission unit
201 video processing system
211-1 through to 211-8 camera
212-1 through to 212-8 cable
213 Ethernet switch
214 cable
215 sending system
401 video processing system
411-1, 411-2 cable
412-1, 412-2 video switcher
413-1.413-2 cable
414 sending system
415 archive system
416 cable
417 band management server
431 communication unit
432 selection unit

The invention claimed is:

1. An apparatus for controlling receiving of a plurality of video data, the apparatus comprising:
a memory; and
circuitry configured to
receive a plurality of video data from a plurality of apparatuses and a request of new video data to be received,
control reception of the plurality of video data, and
control a display to display candidate video data to be stopped, wherein
when transmission bandwidth is not enough to receive the video data and the requested new video data, the candidate video data is displayed in order to select video data for which reception is to be stopped,
the circuitry is configured to stop reception of selected video data and start receiving the requested new video data, and
the circuitry is configured to select, until a total of usage bands of candidates of video data for which reception is to be stopped and a presently empty band become a usage band of the new video data or higher, the candidates in an order of lowest priority degree from among video data being received, a priority degree being dynamically set for the video data being received, based on a transmission stop time and afterwards, select video data to be excluded from the candidates for which reception is to be stopped.

2. The apparatus according to claim 1, wherein the circuitry is configured to control the display to display transmission stop time and usage band.

3. The apparatus according to claim 1, wherein the priority degree is dynamically set for the plurality of video data received, based on the transmission stop time, such that a priority degree of video data with a longest transmission stop time is set lowest.

4. The apparatus according to claim 1, wherein the circuitry is configured to select the video data to be excluded from the candidates in a range where a total of usage bands of the candidates and a presently empty band does not become a usage band of the new video data or lower.

5. The apparatus according to claim 1, wherein the circuitry is configured to, after selecting the video data to be excluded from the candidates, stop reception of video data finally remaining in the candidates.

6. A method comprising:
  receiving, by circuitry, a plurality of video data from a plurality of apparatuses and a request of new video data to be received;
  controlling, by the circuitry, reception of the plurality of video data;
  controlling, by the circuitry, a display to display candidate video data to be stopped;
  when transmission bandwidth is not enough to receive the video data and the requested new video data, the controlling controls the display to display the candidate video data in order to select video data for which reception is to be stopped;
  stopping, by the circuitry, reception of selected video data and starting receiving the requested new video data; and
  selecting, by the circuitry, until a total of usage bands of candidates of video data for which reception is to be stopped and a presently empty band become a usage band of the new video data or higher, the candidates in an order of lowest priority degree from among video data being received, a priority degree being dynamically set for the video data being received, based on a transmission stop time, and afterwards, selecting video data to be excluded from the candidates for which reception is to be stopped.

7. The method according to claim 6, wherein the controlling controls the display to display transmission stop time and usage band.

8. An apparatus comprising:
  a receiving section configured to receive a plurality of video data from a plurality of apparatuses and a request of new video data to be received;
  a reception control section configured to control reception of the plurality of video data;
  a display control section configured to control a display to display candidate video data to be stopped, and when transmission bandwidth is not enough to receive the video data and the requested new video data, the display control section controls displaying of the candidate video data in order to select video data for which reception is to be stopped;
  a stop and start section configured to stop reception of selected video data and start receiving the requested new video data; and
  a selection section configured to select, until a total of usage bands of candidates of video data for which reception is to be stopped and a presently empty band become a usage band of the new video data or higher, the candidates in an order of lowest priority degree from among video data being received, a priority degree being dynamically set for the video data being received, based on a transmission stop time, and afterwards, select video data to be excluded from the candidates for which reception is to be stopped.

9. The apparatus according to claim 8, wherein the display control section is configured to control the display to display transmission stop time and usage band.

* * * * *